US010746630B2

(12) United States Patent
Jalali et al.

(10) Patent No.: US 10,746,630 B2
(45) Date of Patent: Aug. 18, 2020

(54) SINGLE-SHOT NETWORK ANALYZER (SINA)

(71) Applicant: THE REGENTS OF THE UNIVERSITY OF CALIFORNIA, Oakland, CA (US)

(72) Inventors: Bahram Jalali, Los Angeles, CA (US); Cejo Lonappan, Los Angeles, CA (US); Asad Madni, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 27 days.

(21) Appl. No.: 16/225,144

(22) Filed: Dec. 19, 2018

(65) Prior Publication Data
US 2019/0219480 A1    Jul. 18, 2019

Related U.S. Application Data

(63) Continuation of application No. PCT/US2017/038451, filed on Jun. 21, 2017.
(Continued)

(51) Int. Cl.
*G01M 11/00* (2006.01)
*H04B 10/073* (2013.01)
(Continued)

(52) U.S. Cl.
CPC ...... *G01M 11/333* (2013.01); *G01M 11/3118* (2013.01); *G01M 11/3145* (2013.01);
(Continued)

(58) Field of Classification Search
CPC ......... G01M 11/3145; G01M 11/3172; G01M 11/3118; G01M 11/333; G06K 9/00536;
(Continued)

(56) References Cited

U.S. PATENT DOCUMENTS 6,288,659 B1 * 9/2001 Jalali ................... H03M 1/1215
                                                    341/137
6,317,240 B1 * 11/2001 Penninckx ......... H04B 10/2525
                                                    385/11
(Continued)

FOREIGN PATENT DOCUMENTS

WO        0193465 A1    12/2001
WO    2017223149 A1    12/2017

OTHER PUBLICATIONS

ISA/US, United States Patent and Trademark Office (USPTO), International Search Report and Written Opinion dated Aug. 18, 2017, related PCT international application No. PCT/US2017/038451, pp. 1-10, claims searched, pp. 11-18.
(Continued)

*Primary Examiner* — Sang H Nguyen
(74) *Attorney, Agent, or Firm* — O'Banion & Ritchey LLP; John P. O'Banion

(57) ABSTRACT

Apparatus and/or method for performing single-shot network analysis of electrical, electronic and electro-optical elements (e.g., components, circuits, modules, sub-systems and/or systems) on a device, or devices, under test (DUT). A pulsed optical source is directed through a first dispersion element to an modulator, while a delayed version of the pulsed optical source is directed to the DUT (pulsed optical source converted to electrical signal if DUT has electrical input), whose electrical output is fed to the modulator whose modulated optical pulse output is stretched through a second optical dispersion element, then converted to an electrical signal and processed to provide analysis and/or display of DUT response.

35 Claims, 15 Drawing Sheets

Related U.S. Application Data

(60) Provisional application No. 62/352,800, filed on Jun. 21, 2016.

(51) Int. Cl.
  *G06K 9/36* (2006.01)
  *G06K 9/00* (2006.01)
  *G06K 9/20* (2006.01)

(52) U.S. Cl.
  CPC ..... *G01M 11/3172* (2013.01); *G06K 9/00523* (2013.01); *G06K 9/00536* (2013.01); *G06K 9/209* (2013.01); *G06K 9/36* (2013.01); *H04B 10/0731* (2013.01)

(58) Field of Classification Search
  CPC ...... G06K 9/36; G06K 9/209; G06K 9/00523; H04B 10/0731; H04B 10/25077; H04B 10/299; H04B 10/505; H04B 10/50577; H04B 10/50597; H04B 10/508
  See application file for complete search history.

(56) References Cited

U.S. PATENT DOCUMENTS

| | | | | |
|---|---|---|---|---|
| 6,718,142 | B1 * | 4/2004 | Murai | H04B 10/25077 398/155 |
| 7,821,633 | B2 * | 10/2010 | Jalali | G01J 3/10 356/301 |
| 2002/0122628 | A1 | 9/2002 | Brennan, III | |
| 2003/0063286 | A1 | 4/2003 | Fan | |
| 2003/0081893 | A1 | 5/2003 | Wing So | |
| 2003/0090674 | A1 | 5/2003 | Zeylikovich | |
| 2003/0112442 | A1 | 6/2003 | Baney | |
| 2005/0002594 | A1 | 1/2005 | Parker | |
| 2005/0147415 | A1 | 7/2005 | Fee | |
| 2006/0261903 | A1 * | 11/2006 | Watanabe | G01R 31/31922 331/45 |
| 2008/0165079 | A1 | 7/2008 | Smith | |
| 2009/0097036 | A1 * | 4/2009 | Galle | G01M 11/3163 356/477 |
| 2009/0216468 | A1 | 8/2009 | Anderson | |
| 2009/0297142 | A1 | 12/2009 | Szafraniec | |
| 2010/0141829 | A1 | 6/2010 | Jalali | |
| 2010/0201345 | A1 * | 8/2010 | Gupta | G02F 7/00 324/96 |
| 2010/0296102 | A1 * | 11/2010 | Galle | G01M 11/3163 356/477 |
| 2012/0182603 | A1 * | 7/2012 | Rapp | H01S 3/13013 359/341.3 |
| 2014/0067300 | A1 * | 3/2014 | Gupta | G02F 7/00 702/66 |
| 2017/0244165 | A1 * | 8/2017 | Ghelfi | H01Q 1/246 |

OTHER PUBLICATIONS

Niemi, Tapio, "Dispersion measurements of fiber-optic components and applications of a novel tunable filter for optical communications", Dissertation for the degree of Technology to be presented with due permission for public examination and debate in auditorium S4 at Helsinki University of Technology (Espoo, Finland) on the Jun. 14, 2002, at 12 o'clock noon, 60 pages.

Lonappan, Cejo Konuparamban et al., "Single-shot network analyzer for extremely fast networks", Applied Optics, vol. 55, No. 30, Oct. 20, 2016, pp. 8406-8412, published online Oct. 11, 2016.

Agilent, "Network Analyzer Selection Guide", Copyright Agilent Technologies, 2008-2014, Published in USA, Feb. 27, 2014, 20 pages.

* cited by examiner

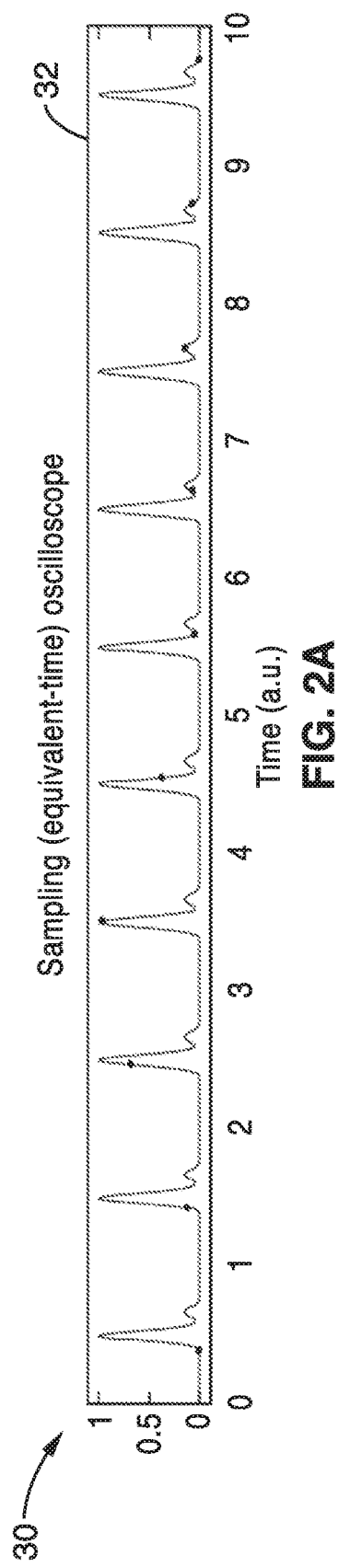
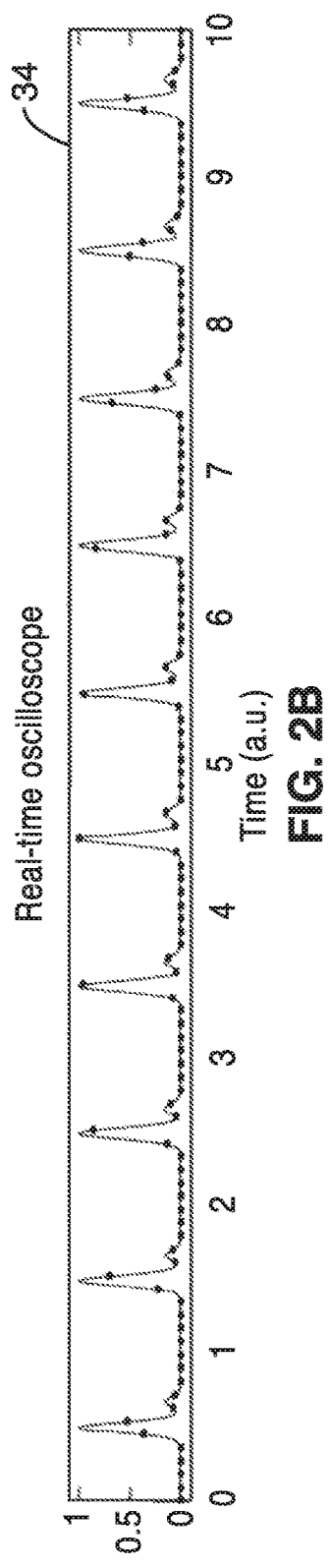
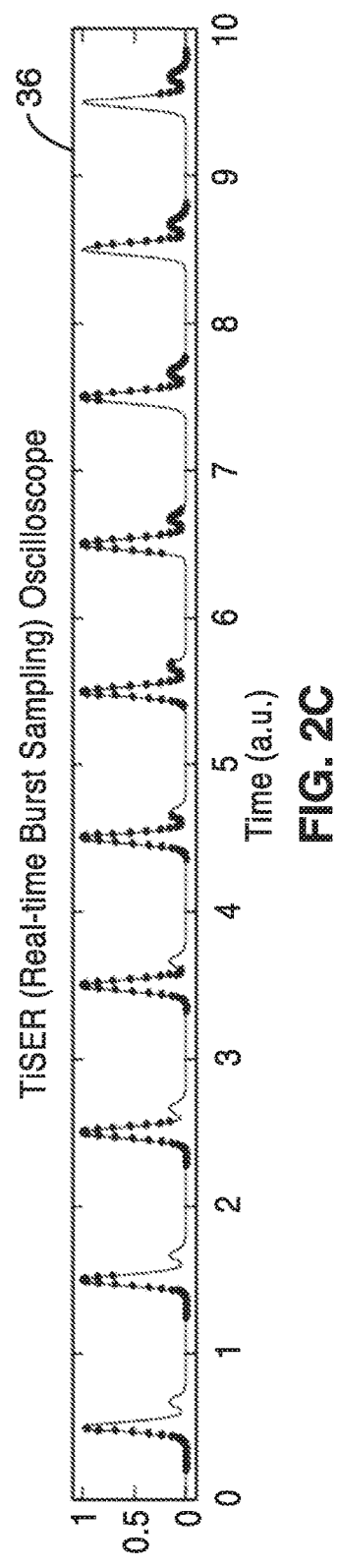
FIG. 2A
FIG. 2B
FIG. 2C

SINGLE-SHOT NETWORK ANALYZER (SINA)

CROSS-REFERENCE TO RELATED APPLICATIONS

This application claims priority to, and is a 35 U.S.C. § 111(a) continuation of, PCT international application number PCT/US2017/038451 filed on Jun. 21, 2017, incorporated herein by reference in its entirety, which claims priority to, and the benefit of, U.S. provisional patent application Ser. No. 62/352,800 filed on Jun. 21, 2016, incorporated herein by reference in its entirety. Priority is claimed to each of the foregoing applications.

The above-referenced PCT international application was published as PCT International Publication No. WO 2017/223149 A1 on Dec. 28, 2017, which publication is incorporated herein by reference in its entirety.

STATEMENT REGARDING FEDERALLY SPONSORED RESEARCH OR DEVELOPMENT

This invention was made with government support under Grant No. 0812072, awarded by the National Science Foundation. The government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to network analyzer instruments, and more particularly to a method and apparatus for performing extremely fast, single-shot, network analysis of optical and electronic devices.

2. Background Discussion

The ever-increasing demand for higher data bandwidth is pushing the communication industry toward ever-increasing operating frequencies for components and systems. Performing accurate instrumentation and measurements of various characteristics of electronic and optical systems, subsystems, modules, devices, and/or circuits at these high bandwidths is a significant challenge. Accurately characterizing and modeling the transfer functions of non-linear elements is also a formidable challenge for the instrumentation and measurement community. Longer test times result in higher test costs, and thus the measurement community seeks technologies to speed component testing. It should be noted that with increasing frequencies, conventional test equipment cost, size, and power consumption also scales up proportionately.

Conventional vector and scalar network analyzers, as well as time domain reflectometers (TDR), are unable to satisfy the above-mentioned requirements, while are also incapable of performing certain measurements, including non-linear system transfer function analysis. Time domain reflectometers, as the name suggests, are utilized for time domain measurements while vector network analyzers (VNA) perform frequency domain measurements. If measurements and modeling can be accurately performed in both frequency, as well as the time domain, using the same instrument (instead of having to switch to different equipment), a considerable time savings, reduced probability of errors, and reduction in cost for additional equipment, would be achieved. In addition, several applications demand extremely low electromagnetic interference (EMI) from the instrumentation systems due to the EMI sensitivity of the device under test, these design efforts to minimize EMI emissions from the test instrument also add to instrument cost.

Accordingly a need exists for enhanced measurement technologies which offer more rapid, robust and broad measurement capabilities. The present disclosure fulfills that need and provides additional benefits over previous solutions.

BRIEF SUMMARY

A single-shot Network Analyzer or SiNA is an instrumentation and measurement system capable of overcoming numerous testing challenges, such as test throughput. The SiNA of the present disclosure utilizes the technique of photonic time-stretch to compress signal bandwidth (into a lower bandwidth), to simplify processing of test signals. Test signal processing, for example, is simplified as it can employ a slower analog-to-digital converter (ADC) to digitize the time-stretched signal, while reducing the need for high speed processing of these signals, such as on a field programmable gate array (FPGA), or other processing circuit, to perform digital signal processing (DSP) in real-time.

Time-stretch technology is a fundamentally different approach to broadband digital receiver technology. Instead of ramping up the speed of backend ADCs and DSPs to keep up with ever accelerating data rates, time-stretch slows down incoming signals before digitization, reducing the bandwidth to a more manageable rate. By employing this technique, lower speed, higher resolution, more energy efficient ADCs and DSPs can be used to capture and process full wideband signals in real-time. The front-end time stretcher effectively boosts the performance of the backend ADC and DSP much more significantly and efficiently than can be achieved by purely electronic techniques alone. In addition, time-stretch architecture scales with ADC and DSP technology, continually improving in resolution and speed as the electronic back-end technology progresses.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 2A through FIG. 2C are plots of results comparing different sampling techniques, including the real-time burst sampling determined according to an embodiment of the present disclosure.

DETAILED DESCRIPTION

1. Introduction

Figure 1:
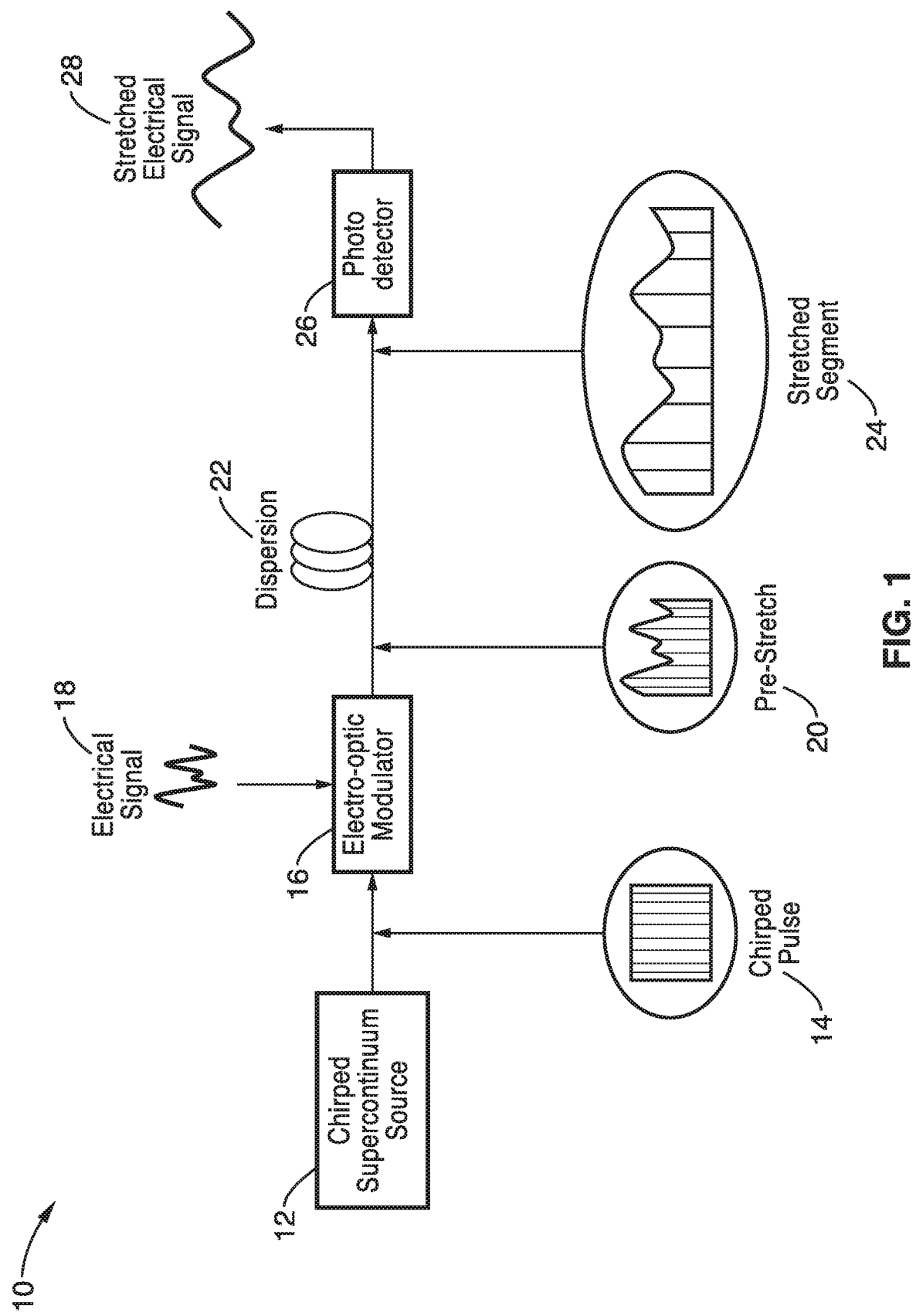
FIG. 1 is a block diagram of a photonic time-stretcher according to an embodiment of the present disclosure.

FIG. 1 illustrates an example embodiment 10 of time-stretching using commercial-off-the-shelf fiber optic components. The broadband signal of interest 12 is modulated onto a pre-chirped optical pulse 14 using an intensity modulator 16 shown receiving electrical modulation signal 18 and outputting a pre-stretched signal 20. The signal 20 is then stretched inside of a dispersion compensating fiber 22 to output a version of the signal which is stretched 24 in time. Upon photo-detection 26, a "slowed down copy" (temporally stretched) 28 of the original signal is generated which can be digitized in real-time bursts and analyzed with lower speed, higher resolution, electrical components. The single channel version of the time stretcher shown above is referred to herein as a time-stretch enhanced recording (TiSER) oscilloscope.

It should be appreciated that high-performance digital oscilloscopes are available in two major types: real-time (RT) oscilloscopes and equivalent time (ET) oscilloscopes. RT oscilloscopes comprise full receivers, digitizing the full wideband signal with high throughput, while at the cost of reduced resolution, lower bandwidth, higher energy consumption, larger footprint, and higher cost. ET oscilloscopes sample incoming repetitive signals at a rate significantly lower than the Nyquist criterion, but can reconstruct repetitive signals by accumulating samples over many periods. ET oscilloscopes are powerful, efficient tools with excellent resolution, jitter performance, and high-bandwidth capabilities, but are limited to analyzing repetitive signals, require a synchronized clock, and because of their low throughput, require a long time to acquire and analyze data.

FIG. 2 depicts a comparison 30 between an equivalent time (sampling oscilloscope) in FIG. 2A with a real time (RT) oscilloscope in FIG. 2B, with a TiSER performing real-time burst sampling as seen in FIG. 2C. The dots shown along each of the signal waveforms represent where samples were obtained for each of the waveform curves 32, 34 and 36. It will be seen that sampling 32 in the equivalent time oscilloscope is obtained at less than the frequency of the waveform, with the real time oscilloscope performing sampling 34 depicted for example as being over ten times the frequency. The sampling 36 performed with TiSER are shown to collect bursts of samples at each sample interval, with the sample interval exemplified as being the same as that of the ET oscilloscope waveform 32 seen in FIG. 2A.

The TiSER oscilloscope, with its real-time burst sampling modality, bridges the gap between RT and ET oscilloscopes, combining high-throughput and flexibility with high-resolution, low jitter, and reduced power, cost and footprint.

2. Single-Shot Network Analyzer (SiNA)

Figure 3:
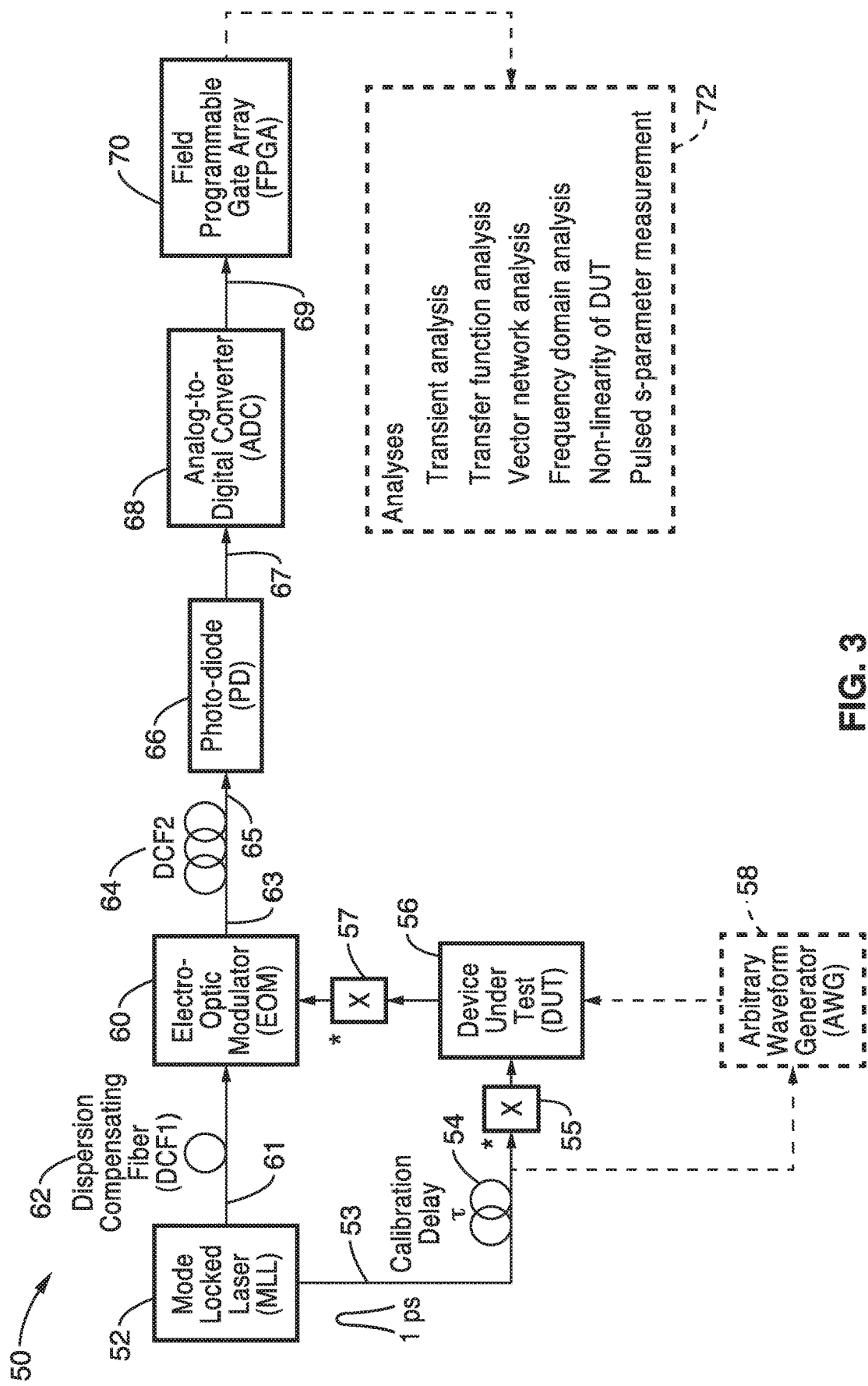
FIG. 3 is a block diagram of a single shot network analyzer (SiNA) according to an embodiment of the present disclosure.

FIG. 3 illustrates an example embodiment 50 of a single shot network analyzer (SiNA) for testing various electrical, electronic or optical devices. The SiNA provides a time-stretch enhanced recording oscilloscope with a high-bandwidth ADC and a reconfigurable FPGA to perform real-time digital signal processing on the digitized data.

More particularly, the ultra-short (e.g., 1 ps) laser pulse from mode locked laser (MLL) 52 is power-split to produce two laser pulses 61 and 53. The laser pulse 53 provides a SYNC output which hasn't undergone time stretching, and is thus used as a test stimulus for impulse response analysis of the device under test (DUT) 56.

The optical SYNC output from delay 54 is shown directed to optional (depicted with * symbol) optical-to-electrical conversion 55 if the input to DUT 56 requires an electrical input instead of an optical input. The calibration delay and optional optical to electrical conversion can be considered to be parts of an optical calibration delay element, according to embodiments of the present disclosure. Output from DUT 56 is shown directed through an optional (depicted with * symbol) optical-to-electrical conversion, for use when the output from DUT 56 is an optical output. Thus, it is clearly seen that this embodiment, and all embodiments of the present disclosure can be utilized with signal converters to allow testing of a wide range of optical, electrical and electronic devices which have inputs and output which are either electrical or optical.

The response signal of DUT 56 is captured (no conversion necessary for an electrical output DUT, but is converted 57 to electrical for an optical output DUT) by an electro-optic modulator (EOM) 60 in single-shot by modulating it onto the chirped laser pulse. A calibration delay line 54 is used to adjust the delay of the impulse signal 53 to synchronize the transient response of the DUT with its intensity modulation of chirped laser pulse 61 passing through dispersion compensating fiber (DCF1) 62 to EOM 60.

In at least one alternate embodiment, the SYNC output 53 of MLL 52 can be used to trigger an arbitrary waveform generator (AWG) 58 to generate the desired type of test stimuli, based on the optimum bandwidth considerations, for the device under test, for example, a sharp rising edge to perform step response analysis or providing the highest resolution for a given bandwidth. It will be noted that the output from AWG is an optional test stimulus for the DUT to be tested with signals other than the impulse test signal.

The laser pulse output 61 from mode locked laser (MLL) 52 is directed through a first dispersion compensating fiber (DCF1) 60 to be received by the electro-optic modulator (EOM) 60. Output 63 (pre-stretch) from EOM 60 is stretched through a second dispersion compensating fiber (DCF2) 64 to produce a stretched response signal 65 into an optical-to-electrical converter (e.g., photo-diode (PD)) 66. The time stretched response signal of the device under test is converted to an electrical signal by optical-to-electrical converter 66 whose analog output 67 is digitized by a fast analog-to-digital converter (ADC) 68 which outputs digitized data 69 that is processed in real-time by a digital processing circuit 70. In at least one embodiment digital processing circuit 70 comprises massively parallel digital hardware, such as implemented on a field-programmable-gate-array (FPGA), application specific integrated circuit (ASIC), or similar circuitry capable of processing these digital signals. Alternatively, a processor may be utilized which executes computational software for running on a computer.

Thus, it is seen above that the output of the DUT is captured in a single-shot by digitization of the corresponding time stretched modulated laser pulse which is processed and analyzed 72, such as selected from the group of processing functions consisting of transient analysis, transfer function analysis, frequency domain analysis, large-signal network and non-linearity analysis of DUT, pulsed s-parameter measurements, or similar measurements and analysis performed on the data captured from the DUT.

3. Typical Configuration for Two-Port Network Analysis

Figure 4:
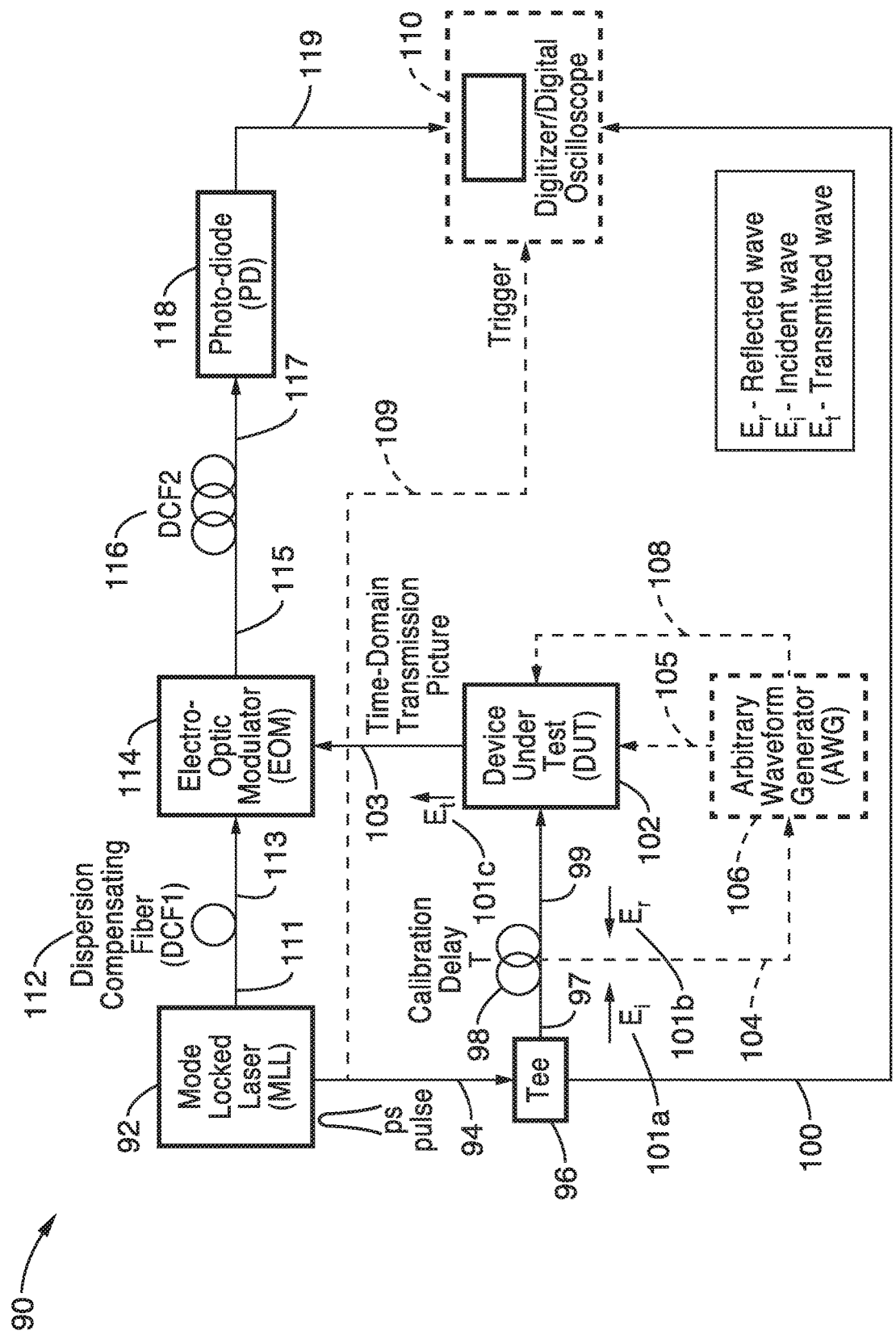
FIG. 4 is a block diagram of a setup for s-parameter measurements on a two-port network as utilized according to an embodiment of the present disclosure.

FIG. 4 illustrates an example embodiment 90 of the SiNA, such as for performing time domain reflection and transmission measurements of a two-port network. A mode locked laser (MLL) 92 is configured to output pulse 94 to tee (power splitter) 96 which outputs a pulse signal 97 to an optical delay 98 to provide a calibration delay of signal 99 reaching device under test (DUT) 102.

In at least one alternate embodiment, an output 104 from the calibration delay 98 can be used to trigger an arbitrary waveform generator (AWG) 106 to generate the desired type of test stimuli 105.

The DUT 102 receives the incident voltage wave Ei 101a, and the corresponding reflected wave generated by it at the input port is Er 101b. The injected voltage wave and the reflected voltage waves by the DUT together represent the time-domain reflection picture (TDR-picture or reflectogram). The transmitted voltage wave represents the time-domain transmission picture (TDT-picture). The transmitted wave Et 101c by DUT 102 is the RF input 103 to the electro-optic modulator 114 which is modulated onto the chirped laser pulse 113. It will be noted that MLL 92 generates a non-stretched signal 111 to DCF1 112 whose output is a chirped laser pulse 113. The modulated laser pulse 115 from EOM 114 is time-stretched by the dispersion compensating fiber DCF2 116 into a time-stretched modulated signal 117. Time-stretched modulated signal 116 is converted to the electrical domain by an optical-to-electrical converter (e.g., photo-diode or photo-detector) 118. The output 119 of optical-to-electrical converter 118 is a TDR-picture received by a circuit 110 for processing and/or display.

By way of example and not limitation, at least one embodiment of circuit 110 comprises a real-time digitizer with FPGA for backend processing in hardware, a real-time oscilloscope with software post processing to determine the transmission and reflection parameters, or similar analysis and/or display apparatus. It should be noted that a portion of the un-stretched mode-locked laser pulse power 94 is coupled 109 as a trigger input to circuit 110.

TDR-pictures can be used to determine the impedance level of the transmission structures and also to localize the errors in a DUT. The reflection coefficient, return loss, voltage standing wave ratio (VSWR), and the scattering parameters, S11 and S22 of a DUT can be determined from the TDR-measurements. The propagation time, the gain/loss, the transmission coefficient, the length, the crosstalk, and the scattering parameters, S12 and S21 can be determined from the TDT-measurements.

4. Results

The SiNA of the present disclosure can be utilized for analyzing various optical, electrical and electronic circuits and elements. The optical synch pulse may be directly received at an optical device under test (DUT), or it may be converted to an electrical signal for receipt by an electrical DUT.

Figure 5:
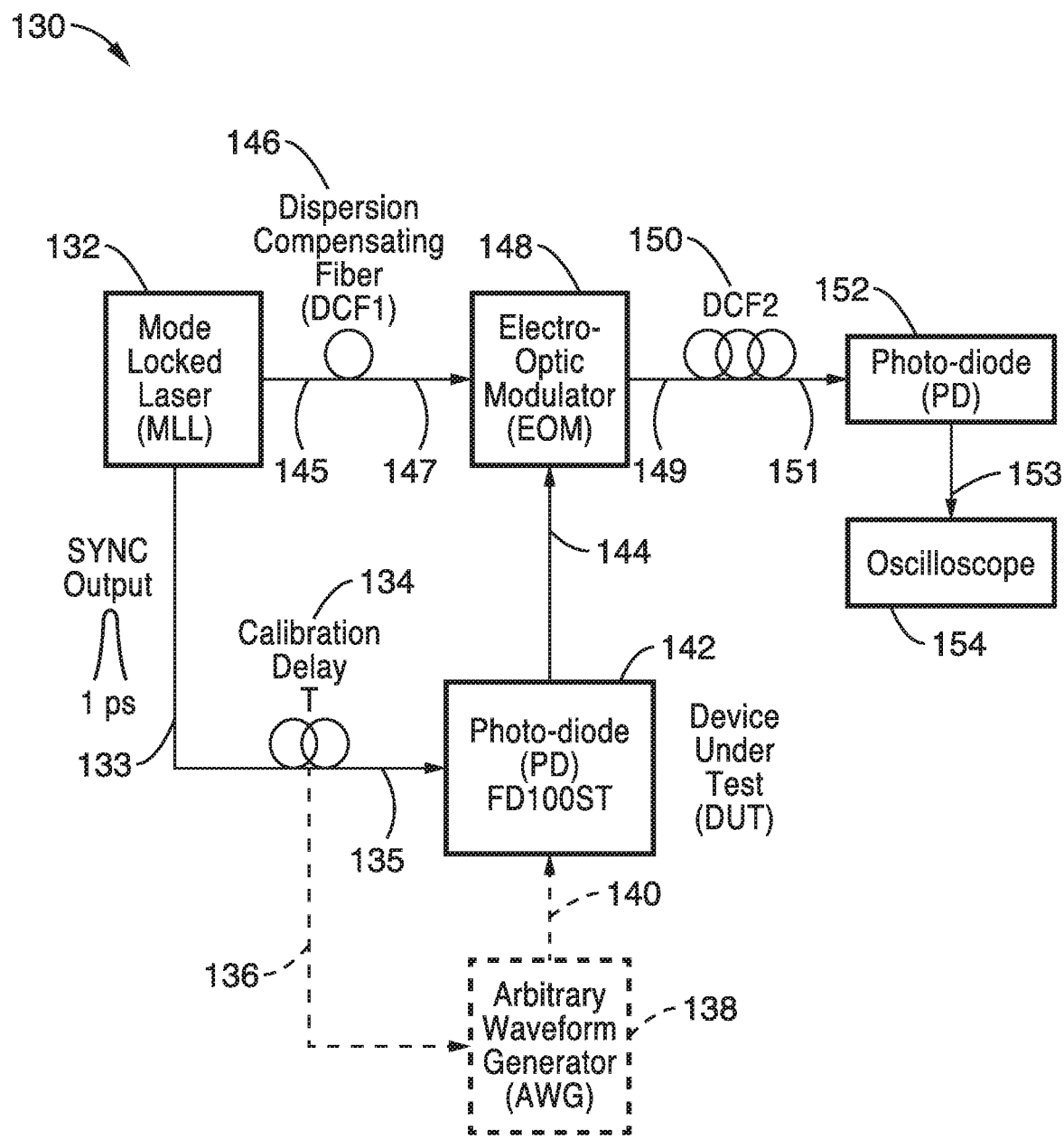
FIG. 5 is a block diagram of a setup for measuring the impulse response of a photo-detector as utilized according to an embodiment of the present disclosure.

FIG. 5 illustrates an example embodiment 130 of a test setup for measuring impulse response of an optical device 142 as DUT. The optical device, by way of example and not limitation, is an InGaAs photo-diode, and in this specific test an FD100ST InGaAs photo-diode. As per the prior embodiments, laser pulse output by MLL 132 is power-split to produce two laser pulse outputs 145 and SYNC output 133. SYNC output 133 is directed through calibration delay 134 creating delayed signal 135 into an optical input of the device under test (DUT) 142. At the same time, mode locked laser output 145 through DCF1 146 creates a chirped analog signal 147 into EOM 148, which receives an input 144 from optical device 142.

DCF1 and DCF2 may differ in their dispersion characteristics, for instance in the present embodiment, DCF1 preferably has a lower dispersion (approximately 20-80 ps/nm) to produce the laser chirp while DCF2 preferably has much higher dispersion (approximately 1000 ps/nm) to stretch the modulated signal. In at least one alternate embodiment, output 136 from calibration delay 134 can be used to trigger an arbitrary waveform generator (AWG) 138 to generate the desired type of test stimuli 140 to DUT 142. In this example, the impulse signal 136 is used to trigger the AWG to produce the appropriate test signal 145 for the device (dice) under test. As the DUT in this implementation has only one test signal input, it could be fed either the delayed impulse signal or the output of the AWG signal. However, in this and other embodiments it should be appreciated that the AWG, or similar circuitry, can be utilized according to the present disclosure, for triggering (synchronizing) other inputs to a DUT requiring multiple active inputs.

The impulse response produced by the photo-diode under test is modulated by EOM 148 onto to the pre-chirped laser pulse before time-stretching it by a desired stretch factor, such as of approximately 8.57 in this example (for D1=−130 ps/nm and D2=−984 ps/nm) as signal 149 passes through DCF2 150 creating stretched signal 151 that is converted at an optical-to-electrical converter (e.g., photo-diode (PD)) 152 to an analog electrical signal 153 that is subsequently processed and/or displayed 154, for example by digitizing it using a 50 GSample/s (GSps) oscilloscope.

Figure 6:
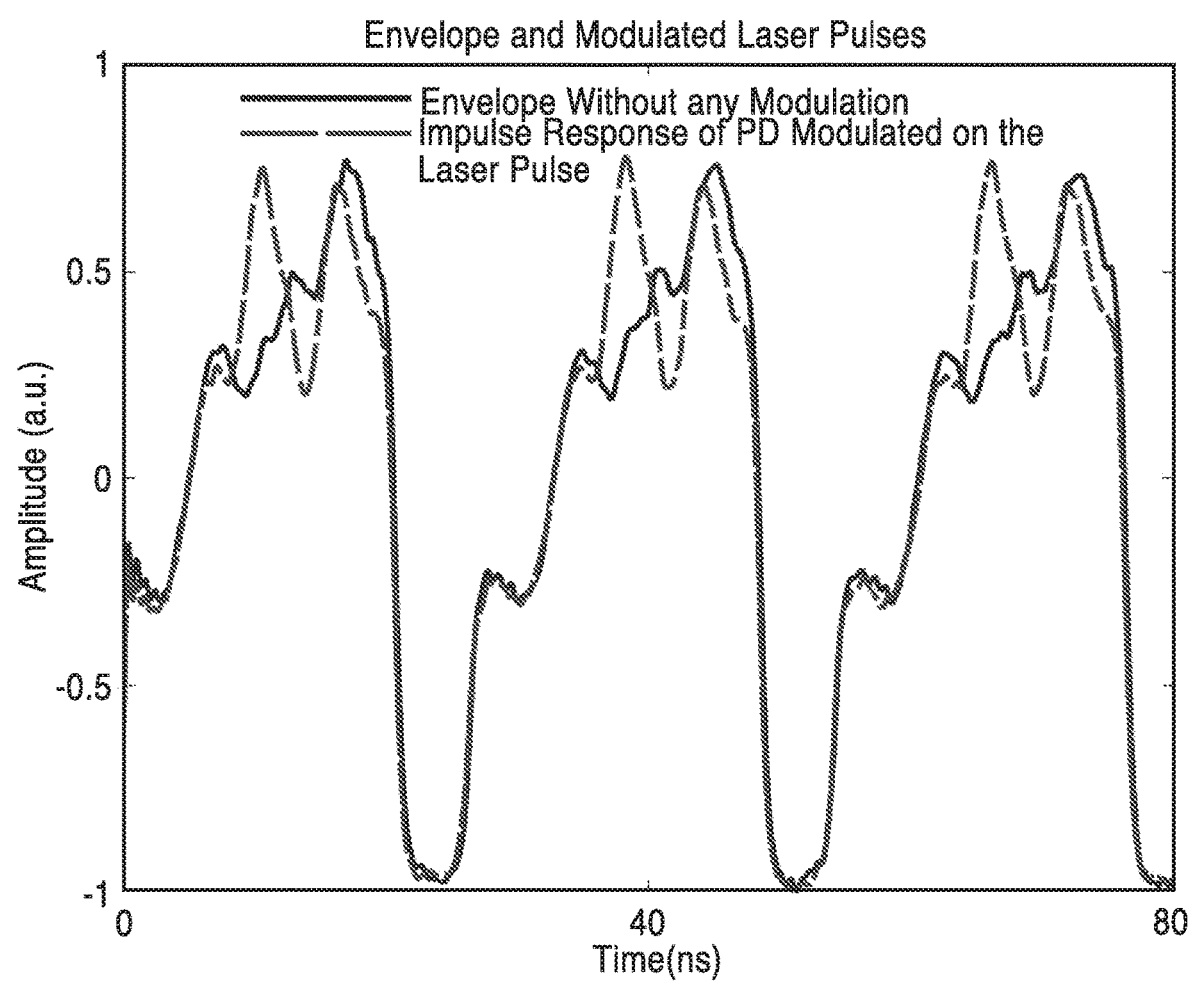
FIG. 6 is a plot of laser envelope with the laser pulse modulated with the impulse response of the photo-detector as determined according to an embodiment of the present disclosure.

FIG. 6 depicts an example result 170 of a synchronized time domain representation of the un-modulated pre-chirped laser pulse from the MLL after time-stretching and the impulse response of the photo-diode under test modulated onto the pre-chirped laser pulse after time-stretching. Shown in the figure are an envelope depicted without modulation in the solid plot line, and an impulse response of the PD modulated on the laser pulse as indicated by the dashed plot line. The time-domain impulse response of the photo-diode under test is obtained by performing a division operation of the modulated impulse response by the un-modulated chirped laser pulse signal.

Figure 7:
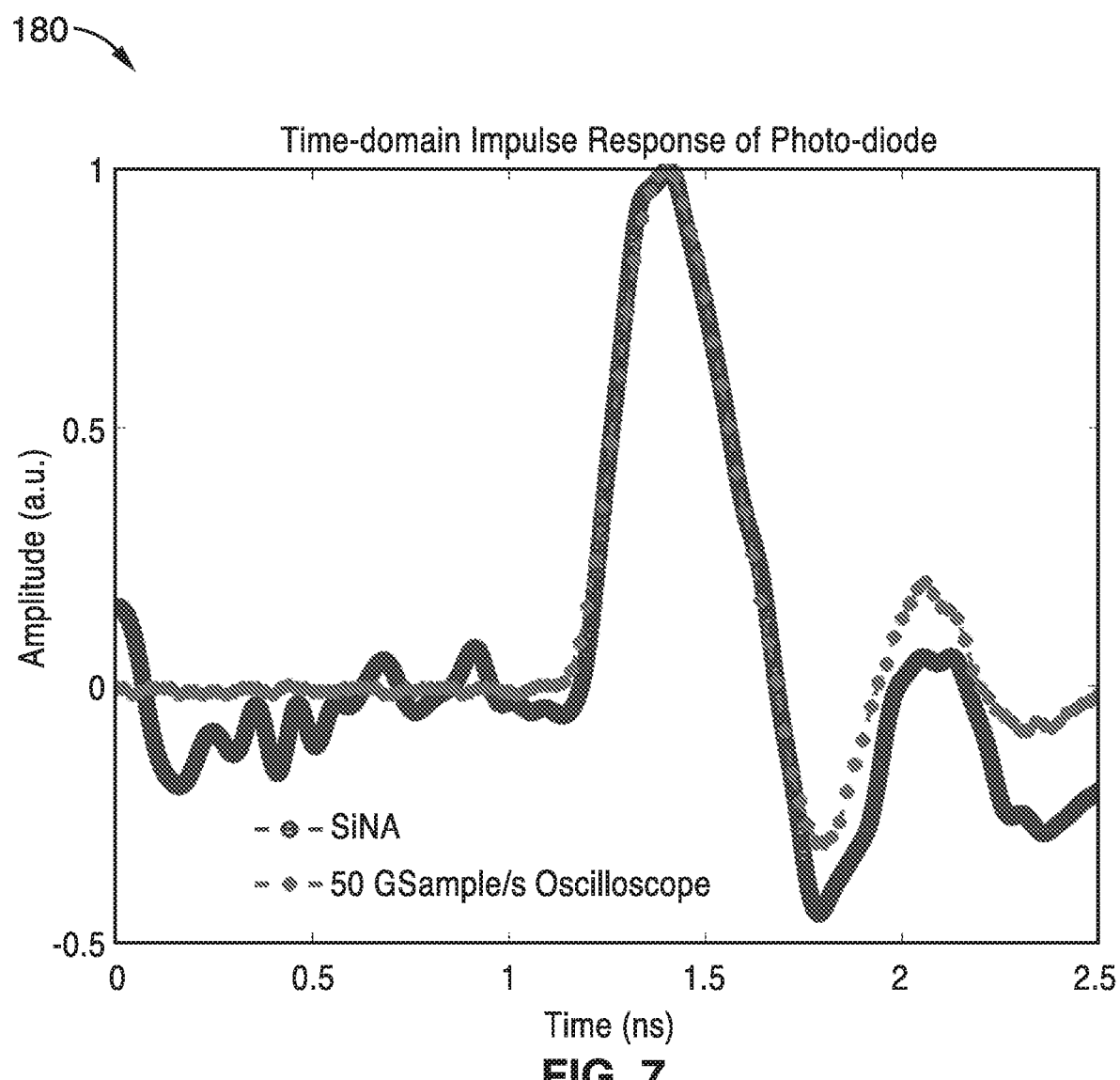
FIG. 7 is a plot of time-domain impulse response of a photo-detector as determined according to an embodiment of the present disclosure.

FIG. 7 depicts an example result 180 showing a plot of time-domain impulse response of the photo-diode under test obtained from SiNA and also from a 50 GSps oscilloscope without a time-stretch front-end. In the figure, the SiNA waveform is depicted with the solid plot line and the waveform created by the 50 G oscilloscope is shown by the dashed line. In this example it is seen that the temporal resolution of SiNA is many times higher (i.e., determined to be 8.57 times better) than the back-end 50 GSps digitizing oscilloscope. It should be noted that the impulse response of the photo-diode under test obtained from SiNA matches with the data sheet from the device manufacturer.

Figure 8:
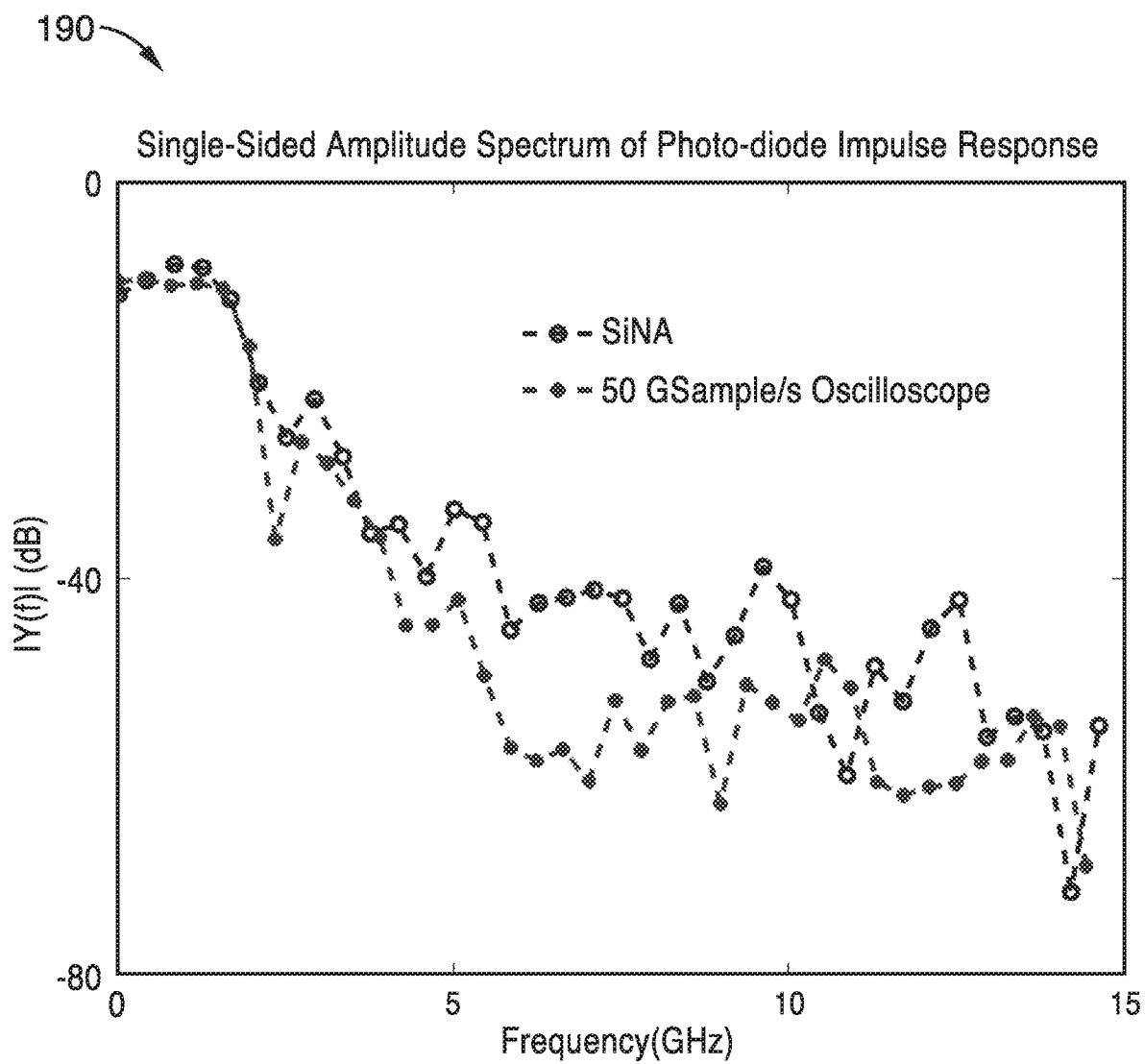
FIG. 8 is a plot of single-sided amplitude spectrum of the impulse response of the photo-detector as determined according to an embodiment of the present disclosure.
Figure 9:
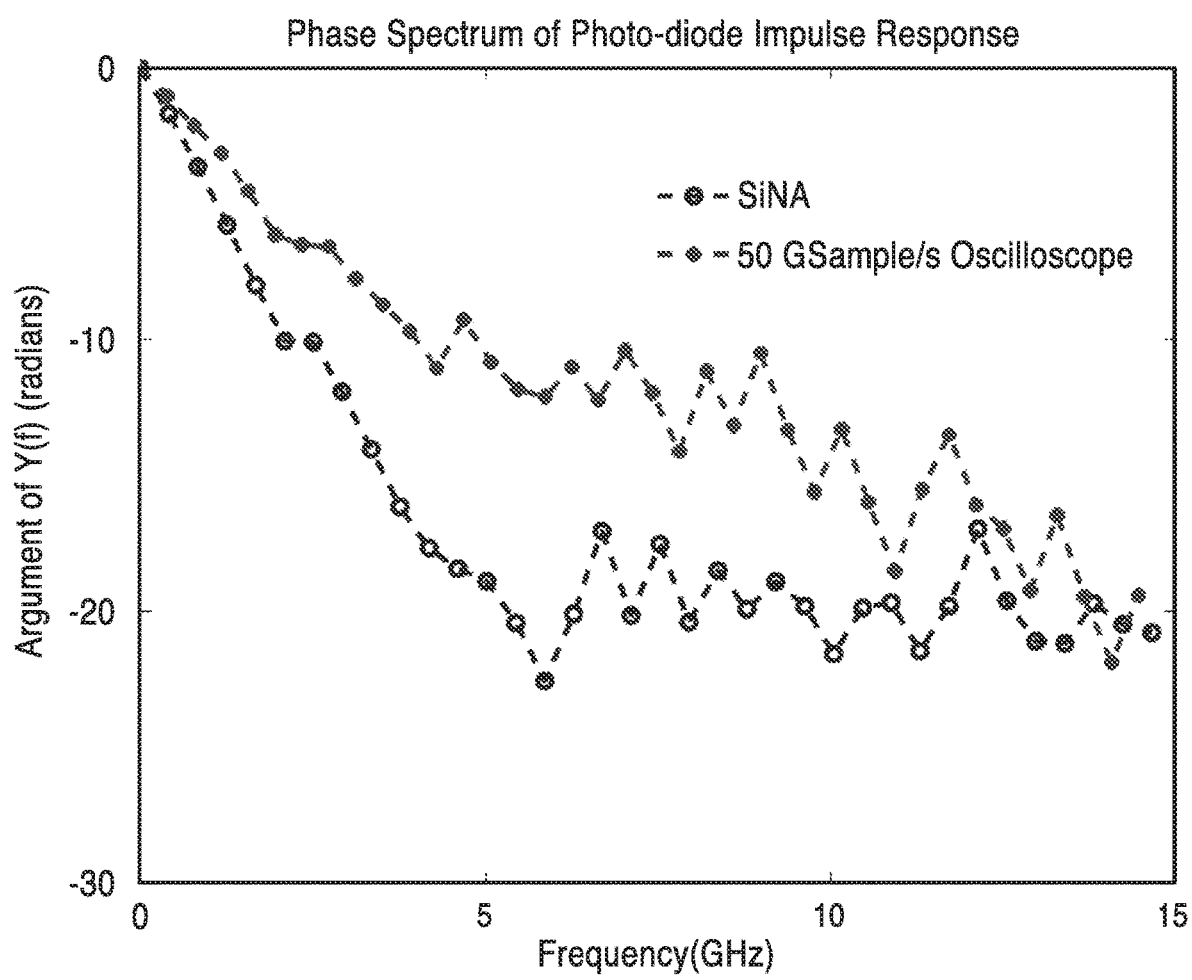
FIG. 9 is a plot of photo-detector phase spectrum of the impulse response as determined according to an embodiment of the present disclosure.

FIG. 8 and FIG. 9 depict examples of single-sided amplitude spectrum 190, and phase spectrum 200, respectively, of the impulse response of the photo-diode under SiNA testing compared with that measured using a 50 GSps oscilloscope. Shown in these figures are an amplitude phase spectrum measurement 190 in FIG. 8, and a phase spectrum measurement 200 in FIG. 9, each showing measurements obtained from a 50 GSps oscilloscope and from the SiNA.

Frequency response obtained from the impulse response measurements using SiNA is consistent with frequency response measurements performed using conventional frequency swept network analyzers, but of course with significantly reduced test time.

Figure 10:
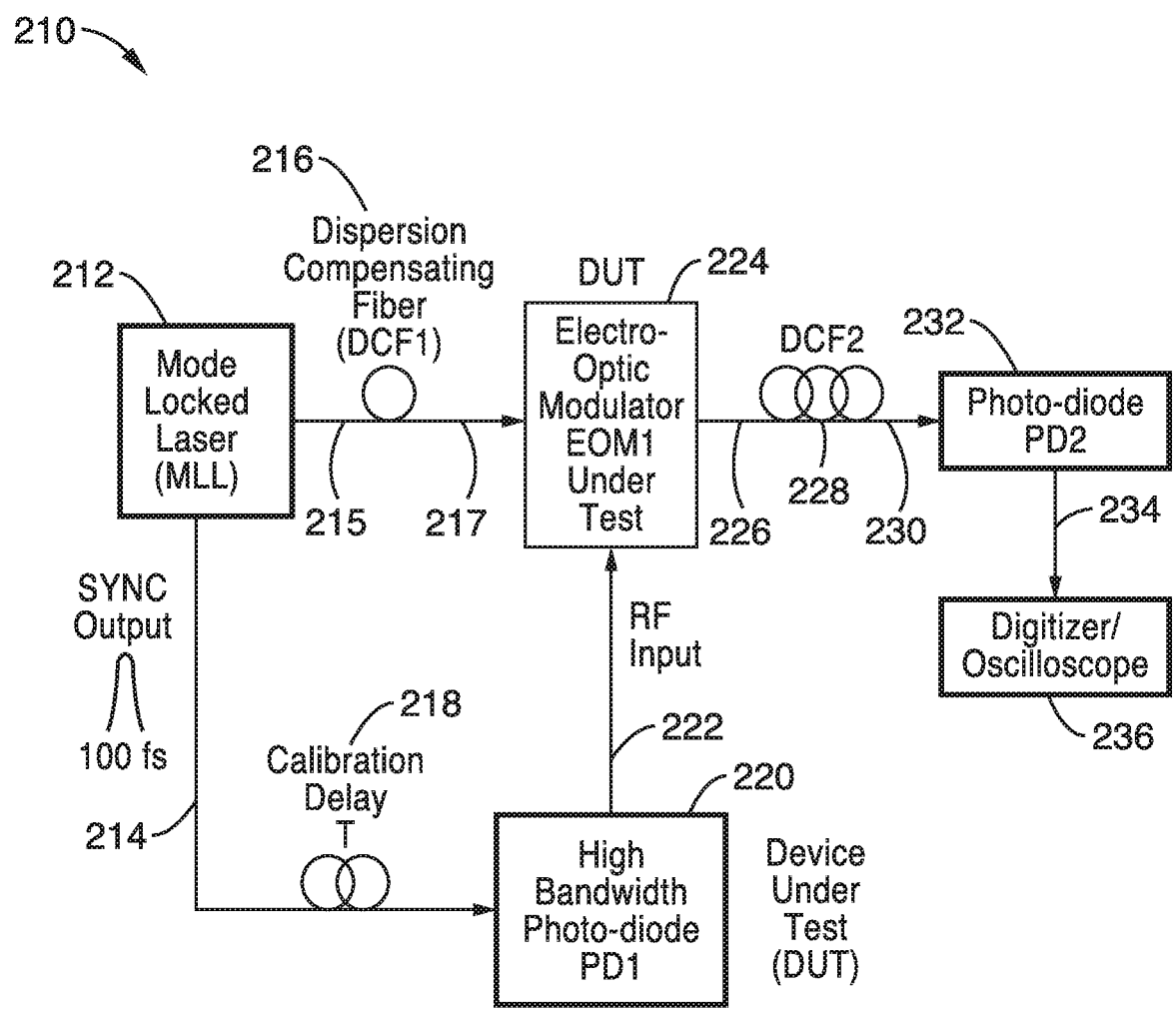
FIG. 10 is a block diagram of a setup for measuring impulse response of an electro-optic modulator according to an embodiment of the present disclosure.

FIG. 10 illustrates an example embodiment 210 of a test setup for measuring impulse response of an electro-optic modulator as DUT 224. As per the prior embodiments, the laser pulse output by MLL 212 is power-split to produce two laser pulse outputs 214, 215. The mode locked laser (MLL) output 215 is directed through DCF1 216 to create dispersed signals 217 for receipt by DUT 224. MLL output 214 is input through calibration delay 218 creating a delayed signal into an optical-to-electrical converter device 220 (e.g., high-bandwidth photo-diode PD1) which outputs an electrical impulse RF signal (test signal) 222 which is fed to the modulator of DUT 224.

The impulse response 226 produced by DUT 224 (e.g., EOM under test) as modulated on the laser pulse is time-stretched by a desired stretch factor, such as of approximately 13.15 in this example (for D1=−81 ps/nm and D2=−984 ps/nm) as signal passes through DCF2 228 creating stretched signal 230 that is converted at an optical-to-electrical converter (e.g., photo-diode (PD2)) 232 to an analog electrical signal 234 that is subsequently processed and/or displayed 236, for example by digitizing it using a 50 GSample/s (GSps) oscilloscope.

Figure 11:
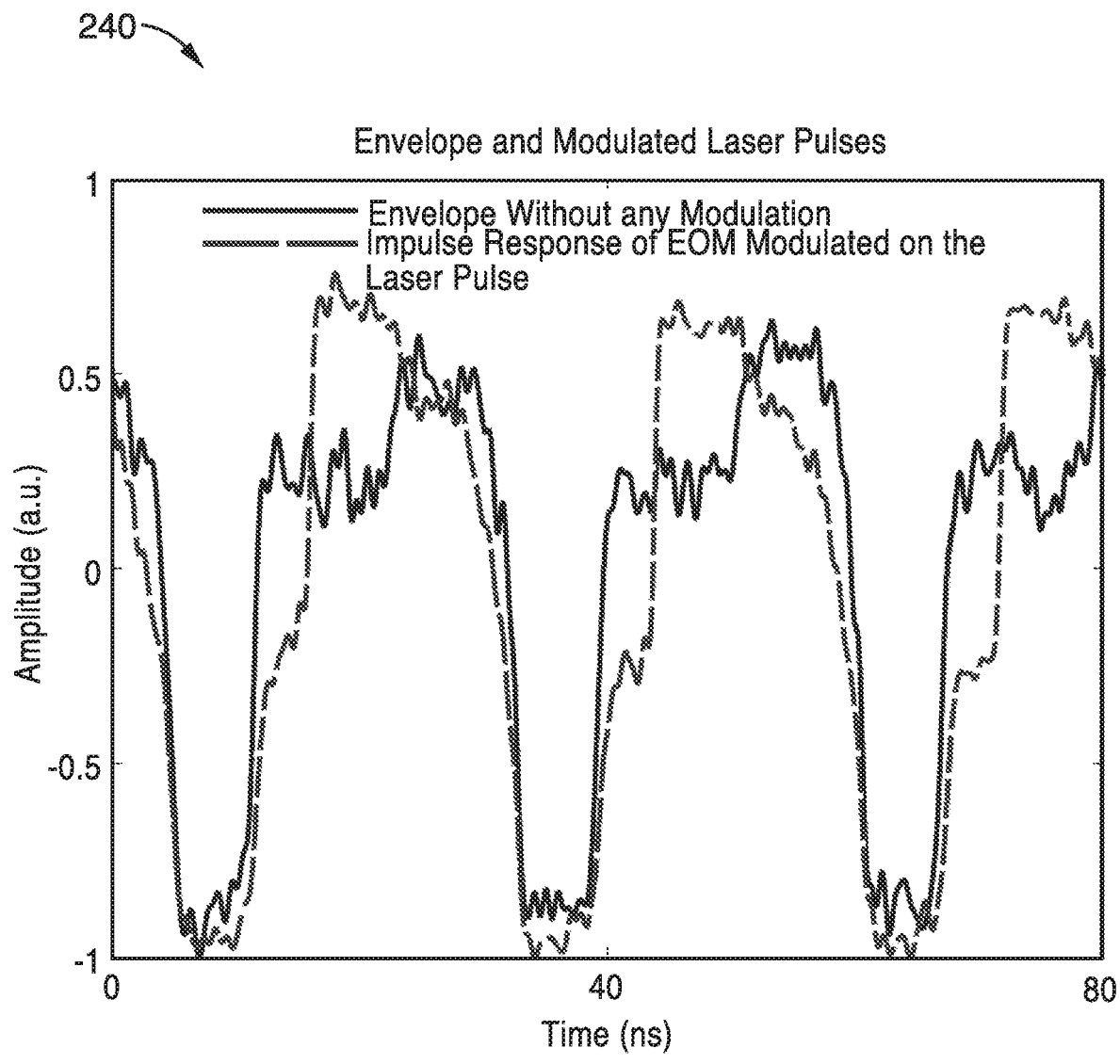
FIG. 11 is a plot of laser envelope with the laser pulse modulated with the impulse response of the electro-optic modulator as determined according to an embodiment of the present disclosure.

FIG. 11 depicts an example result 240 of a synchronized time domain representation of the un-modulated pre-chirped laser pulse from the MLL after time-stretching and the impulse response of the EOM under test modulated on the laser pulse after time-stretching. Shown in the figure are an envelope depicted without modulation in the solid plot line, and an impulse response of the EOM modulated on the laser pulse as indicated by the dashed plot line. The time-domain impulse response of the EOM under test is obtained by performing a division operation of the modulated impulse response by the un-modulated chirped laser pulse signal.

Figure 12:
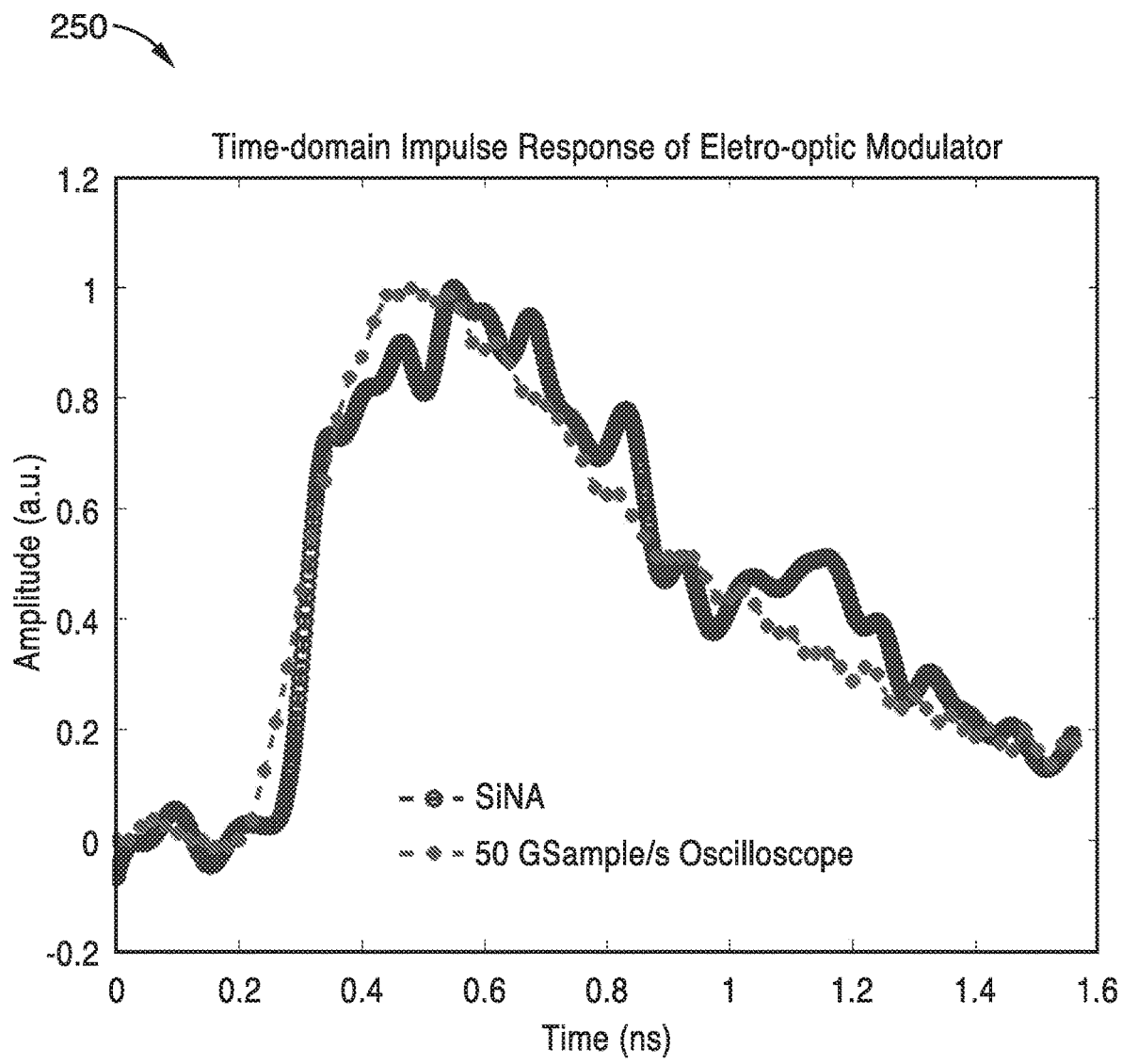
FIG. 12 is a plot of time-domain impulse response of an electro-optic modulator as determined according to an embodiment of the present disclosure.

FIG. 12 depicts an example result 250 showing a plot of time-domain impulse response of the photo-diode under test obtained from SiNA and also from a 50 GSps oscilloscope without a time-stretch front-end. In the figure, the SiNA waveform is depicted with the solid plot line and the waveform created by the 50 G oscilloscope is shown by the dashed plot line. In this example it is seen that the temporal resolution of SiNA is many times higher (i.e., determined to be 13.15 times better) than the back-end 50 GSps digitizing oscilloscope.

Figure 13:
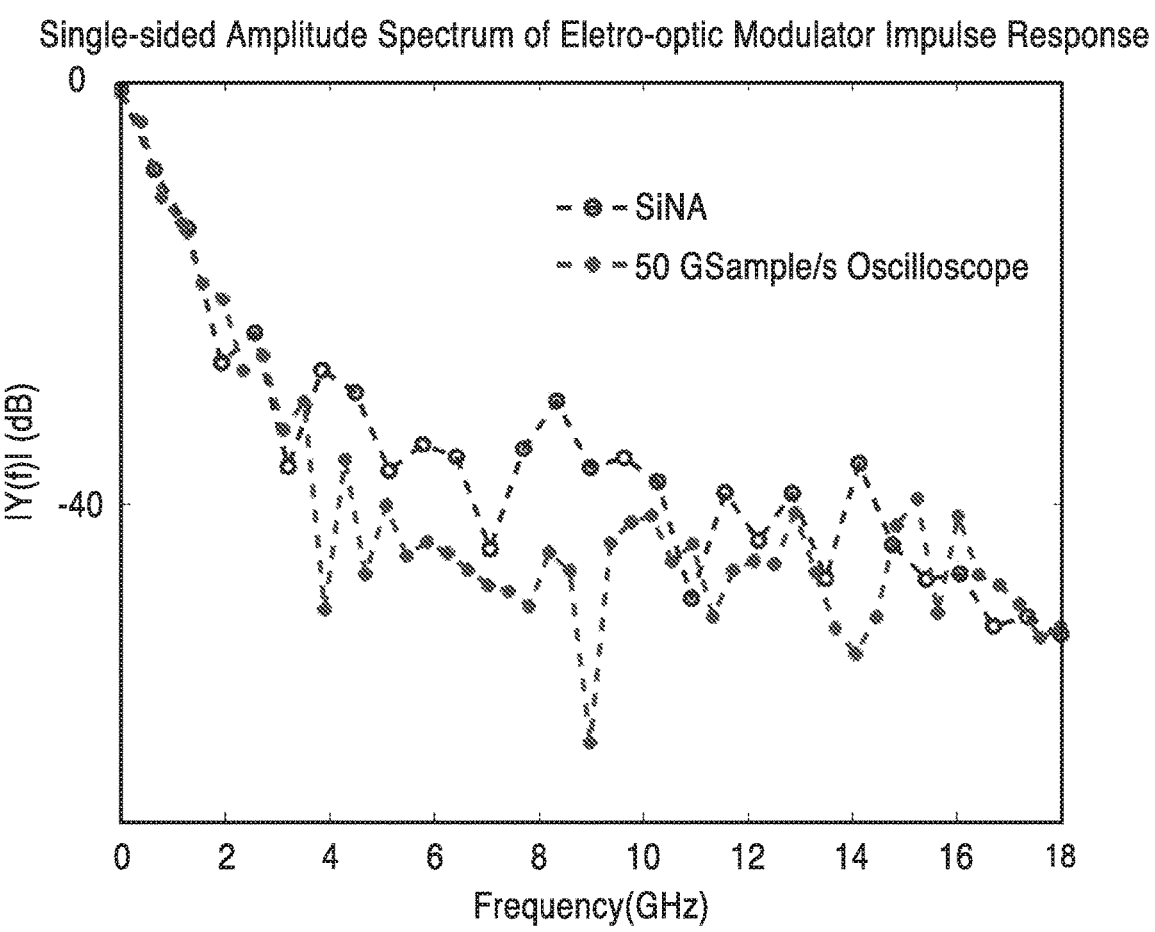
FIG. 13 is a plot of single-sided amplitude spectrum of the impulse response of the electro-optic modulator as determined according to an embodiment of the present.
Figure 14:
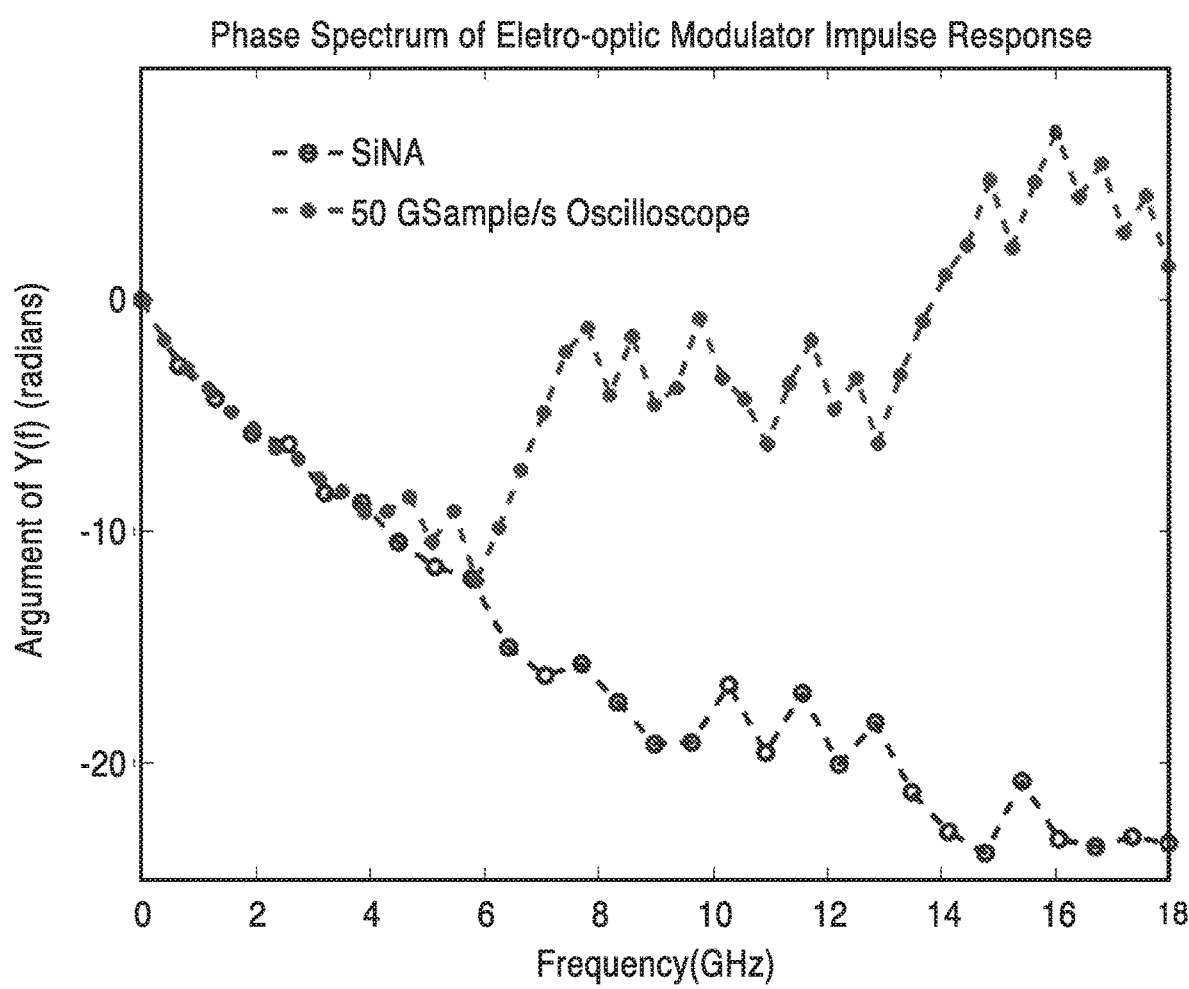
FIG. 14 is a plot of electro-optic modulator phase spectrum of the impulse response as determined according to an embodiment of the present disclosure.

FIG. 13 and FIG. 14 depict examples of single-sided amplitude spectrum 260, and phase spectrum 270, respectively, of the impulse response of the EOM under test. Shown in the figures are plot lines for the EOM as tested by SiNA, and those obtained from a 50 GSps oscilloscope. At higher frequencies, the frequency response measured from the oscilloscope becomes erroneous due to its lower temporal resolution and bandwidth limitation.

It should be appreciated that conventional network analyzers can take many minutes, even hours, for performing the frequency response measurements of the example devices under test, in particular the exemplified photo-diodes and electro-optic modulators, whereas SiNA requires only 27 ns to make a single-shot impulse measurement, as was seen FIG. 7 for the photo-diode and FIG. 11 for the EOM, to produce their frequency responses in amplitude and phase spectrum, as was depicted in FIG. 8, FIG. 9, FIG. 13 and FIG. 14.

5. Specifications

Table 1 shows a comparison of the specifications of SiNA with a bench-top commercial vector network analyzer. In tests of the present SiNA disclosure, acquisition time was found to be 27 ns which is significant faster than any commercial VNA and is a direct result of the unique high-speed, single-shot, measurement architecture of SiNA. The equivalent sampling rate of SiNA in a single-shot due to time-stretching is 750 GSps whereas in commercial VNAs, the signal is down-converted and digitized using a lower sampling rate ADC.

Commercial VNAs, such as Keysight® N5251A, provide an operational bandwidth of 300 kHz to 110 GHz. The operational bandwidth of the disclosed SiNA is 5 GHz to 40 GHz based on the current EOM used. The upper limit of bandwidth of SiNA is limited by the bandwidth of the electro-optic modulator utilized, which can be well over 100 GHz and which is commercially available. The lower limit of the operational bandwidth of the disclosed SiNA depends on laser repetition rate, dispersion of DCFs and the MLL chirped pulse width. However, it should be appreciated that SiNA is capable of testing opto-electronic devices, circuits, subsystems, and/or systems within an operational bandwidth that is orders of magnitude faster than commercial VNAs with great accuracy toward enabling shorter test times, thus reducing test cost in production testing applications.

Jitter in SiNA is largely caused by the intra-pulse jitter of the mode-locked laser which is significantly reduced by the time-stretching, resulting in an intra-pulse jitter of 5 fs which is extremely low compared to 250 fs jitter suffered in state-of-the-art conventional electronic digitizers. SiNA is extremely power efficient, such as exemplifier herein which consumed only 150 W when used with a 3 GSps digitizer and an FPGA to perform digitization and measurement analyses, which compares to over 670 W for a commercial bench-top VNA. SiNA is also very compact compared to a commercial bench-top VNA.

6. Advantages and Applications

The disclosed SiNA technique can be utilized in a wide range of high speed applications, for example and not limitation, characterizing RF, microwave and optical devices or systems, such as photo-diodes, optical receivers, heterodyne and homodyne receivers, instantaneous frequency monitors (IFMs), RF and microwave components, and so forth.

Figure 15:
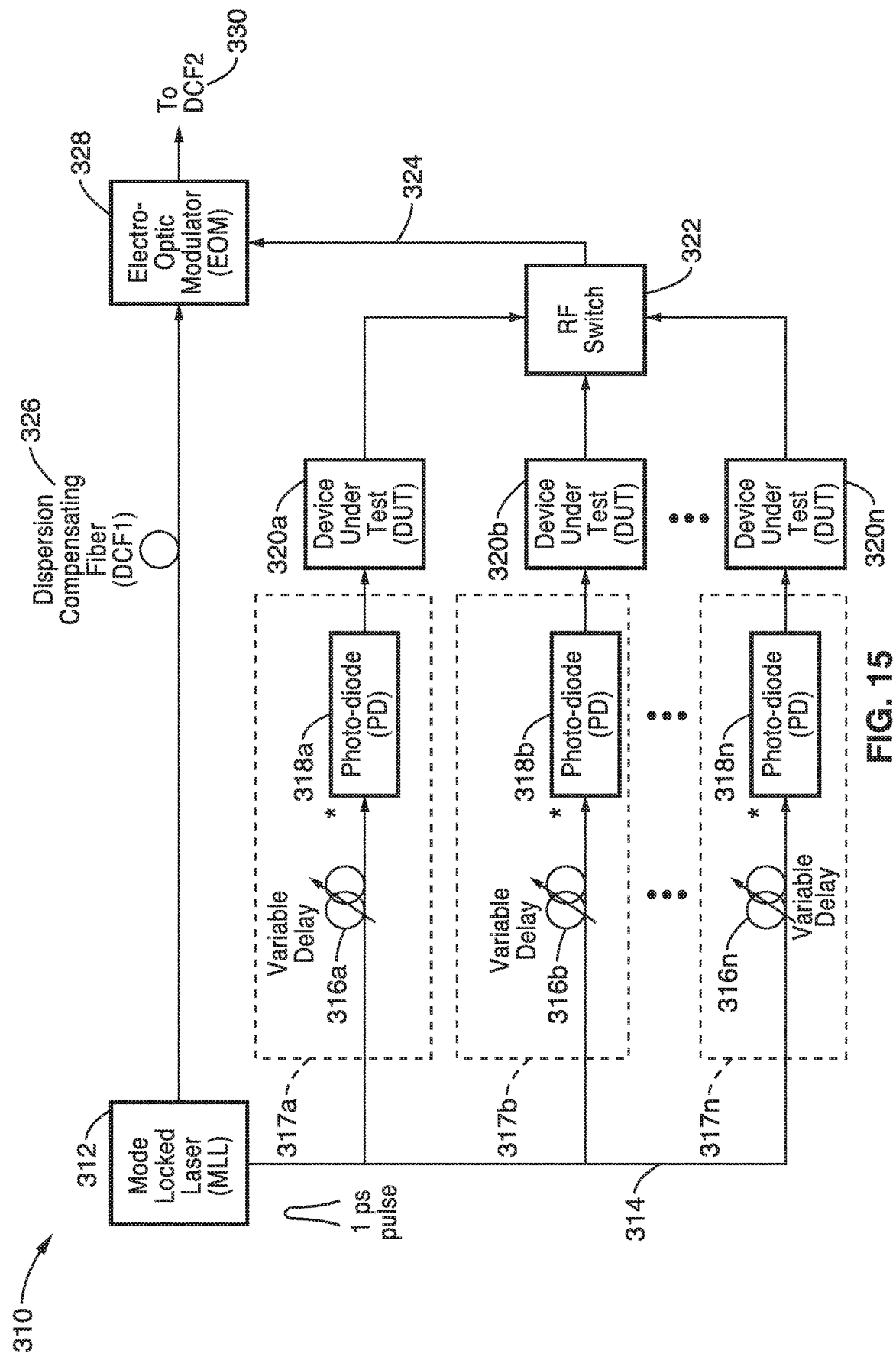
FIG. 15 is a block diagram of a fast multiple device testing SiNA front-end for production-level automated test equipment (ATE) with significantly reduced test times according to an embodiment of the present disclosure.

FIG. 15 illustrates an example embodiment 310 of showing a method and apparatus for testing multiple electrical or optical devices from a single MLL 312 generating test signal 314 that is subject to delay and processing by calibration delay elements 317a, 317b through 317n. Each calibration delay element includes a variable delay 316a, 316b through 316n to stagger the pulses received by an optional optical-to-electrical converter 318a, 318b through 318n such as a photo-diode, coupled to electrical DUTs 320a, 320b through 320n. It will be noted that the optional optical-to-electrical converters 318a, 318b through 318n are depicted as optional (*) as these are not used when testing optical DUTs, as the delayed optical signals do not need to be converted to electrical signals before reaching the DUTs.

In at least one embodiment, outputs from the DUTs may be directed to multiple modulators, such as 328 coupled to the output of each DUT 320a, 320b through 320n. However, toward reducing the amount of circuitry required, the figure depicts using a multiplexer/switch to direct the temporally staggered output from the DUTs. Thus, in this figure, outputs from these DUTs are switched (multiplexed) by an RF switch 322 that outputs a combined signal 324 to an electro-optic modulator (EOM) 328, which also receives an MLL signal through DCF1 326, and outputs a combined signal 330 for receipt at DCF2. It should also be appreciated that if the DUTs have optical outputs, then these can be combined into a single optical signal, then converted by an optical-to-electrical converter to an electrical signal, for modulator 328. Alternatively, the optical output of each DUT can be received by an optical-to-electrical converter and then passed to multiplexor/switch 322. In each case the output from the modulator, or modulators, are then passed through a second DCF, or DCFs, to stretch the modulated optical signal prior to conversion to an analog electrical signal by an optical-to-electrical converter, followed by any desired conversion to digital (e.g., ADC) and digital processing that is to be performed.

It should be appreciated that numerous applications can benefit from providing extremely fast test times (e.g., 27 ns) that SiNA offers which is significantly faster than the current state-of the art testing which require microseconds. Accurate transient response analysis of various devices, circuits, subsystems, systems, and so forth under test could be performed by stimulating them with different test signals generated by the AWG synchronized with the appropriately delayed SYNC pulse. Once the time domain digitized data, on a single-shot basis is captured by the FPGA, both time and frequency domain measurements on the signal can be performed within the FPGA by the use of the Fast Fourier Transform (FFT). The instrument can perform the function of a vector network analyzer by analyzing the amplitude and phase of the output signal and also produce Bode plots. The input stimulus can be also used to perform time domain reflectometry (TDR) measurements. In addition, the instrument can be used for testing impulse response of high bandwidth analog-to-digital converters.

The presently disclosed SiNA is particularly well-suited for making extremely fast impulse response measurements of optical devices, such as photo-diodes and electro-optic and electro-absorption modulators, and high-speed electronic devices, such as power amplifiers and low noise amplifiers, and so forth. SiNA is equipped with an ultra-short laser pulse source to provide test stimulus unlike conventional techniques that demand a separate laser pulse source to be used with the electronic instrumentation backend. Non-linear and large signal behavior of various optical or electrical devices and systems and high-speed dynamics of high speed circuits and systems can be readily studied using the real-time burst sampling employed in SiNA, these signals would otherwise in many cases be impossible to capture using conventional instruments. Dynamic Error Vector Magnitude (EVM) measurements of devices, such as power amplifiers (PA), can be obtained by analyzing their transient response in single shots. Single-shot analysis using SiNA can aid in faster time domain filter tuning which otherwise is time-consuming as the conventional instruments have to sweep across a large frequency range to accurately determine it.

Highly accurate noise figure measurements are possible with SiNA as the front-end optics do not emit EMI, and are not susceptible to radiated or conducted electromagnetic interference (EMI). This is a significant advantage when SiNA is employed for performing measurements on EMI sensitive device and/or devices which emit EMI, for instance coils such as utilized in magnetic resonance imaging (MRI) and nuclear magnetic-resonance (NMR). Conventional equipment used for these purposes must be custom designed and shielded in order to avoid EMI emissions, whereas in SiNA not much effort is required in this regard. The low power opto-electronic front end of SiNA makes possible its use in signal analysis under hostile environments providing it with a significant advantage over current state-of-the-art. Additionally, the time-stretched optical signal containing the data could be transmitted over an optical fiber for analysis in remote locations using the backend electronics. This is a unique feature absent in most conventional instruments.

7. Applications for Automated Test Equipment (ATE)

Single-shot operation significantly reduces the test time of optical and high speed RF devices by automated test equipment (ATE) employing the disclosed SiNA. In addition, the laser pulse output from a single mode-locked laser can be used to test multiple devices as was shown in FIG. 15, the setup comprises variable optical delay lines to delay the laser pulse input to the various devices under test and employs only one electro-optic modulator to sample the responses of the devices under test by switching between the device responses using an RF switch. For testing optical devices, the optical output from variable delay lines goes directly to the DUTs instead of going to photo-diodes (PD). The output of optical DUTs are converted to electrical signals by photo-diodes and then provided as input to the RF switch that selects the output response to be modulated by the EOM. It should be appreciated that the mode-locked laser and electro-optic modulator are the expensive components of the SiNA and by using the above method, the cost of the system is significantly reduced for performing fast testing of multiple devices. The number of electro-optical modulators can be increased to increase the amount of simultaneous testing performed on the multiple DUTs.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An apparatus for performing single-shot network analysis of electrical, electronic and electro-optical elements as a device under test (DUT), the apparatus comprising: (a) a pulsed optical source configured for generating a pulsed optical output; (b) a first dispersion element configured for receiving said pulsed optical output and chirping it into a chirped pulsed optical output; (c) a modulator configured for receiving said chirped pulsed optical output; (d) an optical calibration delay element which receives said pulsed optical output and generates a delayed pulse source signal configured for receipt by a device under test (DUT), so that an electrical response signal from the DUT overlaps in time with said chirped pulsed optical output; (e) said modulator is configured for modulating segments of said electrical response signal from the DUT over said chirped pulsed optical output and generating a modulated optical pulse output; (f) a second dispersion element configured for receiving said modulated optical pulse output and time-domain stretching it into a stretched optical source signal; and (g) an optical detector configured for receiving said stretched optical source signal and converting it into an analog electrical signal configured for analysis and/or display.

2. The apparatus of any preceding embodiment, wherein said optical calibration delay element is configured to either: (1) delay said pulsed optical output for receipt by an optical input of an optical device under test (DUT), or to (2) delay said pulsed optical output and convert it to a pulsed electrical output signal for receipt by an electrical input of a device under test (DUT).

3. The apparatus of any preceding embodiment, further comprising an arbitrary waveform generator configured for receiving said pulsed optical output and generating said delayed pulse source signal of suitable bandwidth for the DUT to be tested from the said pulsed optical source.

4. The apparatus of any preceding embodiment, wherein said modulator comprises a modulator selected from the group of modulators consisting of electro-optic modulators (EOMs), Mach-Zehnder modulators, and electro-absorption modulators (EAMs).

5. The apparatus of any preceding embodiment, further comprising:
(a) an analog-to-digital converter (ADC) configured for converting said analog electrical signal into a digital signal; and (b) a digital processing device, and memory storing instructions executable by said processing device, configured for capturing a segment of said digital signal and performing network analysis and/or display of said digital signal.

6. The apparatus of any preceding embodiment, wherein said analog-to-digital converter (ADC) is configured for converting the electrical equivalent of the stretched optical source and which operates at a substantially lower frequency than said input signal being captured by said apparatus.

7. The apparatus of any preceding embodiment, wherein said digital processing device comprises a field programmable gate array (FPGA).

8. The apparatus of any preceding embodiment, further comprising instructions stored in memory and executable by said digital processing device for performing time-domain reflectometry (TDR) comprising averaging repetitive reflected waveforms over multiple scans and increasing sensitivity and/or reducing test time.

9. The apparatus of any preceding embodiment, wherein said electrical, electronic and/or electro-optical elements are selected from the group of elements consisting of electrical, electronic and electro-optical: components, circuits, modules, sub-systems and systems.

10. The apparatus of any preceding embodiment, wherein said pulsed optical source is configured with a mode-locked laser (MLL) coupled through a highly non-linear fiber (HNLF).

11. The apparatus of any preceding embodiment, wherein said second dispersion element comprises a dispersive optical fiber or a Fiber Bragg Grating (FBG).

12. The apparatus of any preceding embodiment, wherein said stretching comprises stretching the input signal up to multiple orders of magnitude longer, in response to which an analog-to-digital converter circuit is utilized which is one or more orders of magnitude slower than bandwidth of the input source.

13. The apparatus of any preceding embodiment, further comprising instructions stored in memory and executable by said processing device for performing high-speed, single-shot two-port network analysis of electrical and optical DUT at 27 ns measurement time.

14. The apparatus of any preceding embodiment, wherein said apparatus is utilized for performing bandwidth measurements, impulse and step response analysis of electrical and optical DUT such as photo-diodes, electro-optic intensity modulators, RF and microwave amplifiers, etc. at significantly reduced test time.

15. The apparatus of any preceding embodiment, wherein said apparatus is utilized for performing bandwidth measurements, impulse and step response analysis of electro-optic phase modulators at significantly reduced test time, by performing phase modulation (PM) to amplitude modulation (AM) conversion, by either (a) coherent detection or (b) dispersion, before providing the PM-AM converted response to a photo-detector, the output of which is to be received by the apparatus.

16. The apparatus of any preceding embodiment, wherein said apparatus is utilized for performing single-shot transient, non-repetitive, non-linear response analysis and large-signal network analysis of electrical and optical DUT at significantly reduced test time.

17. The apparatus of any preceding embodiment, wherein said apparatus is utilized for single-shot two-port vector network analyses on the DUT.

18. The apparatus of any preceding embodiment, wherein said single-shot two-port vector network analyses on the DUT comprise generating plots of amplitude, frequency and/or phase.

19. The apparatus of any preceding embodiment, wherein said apparatus is utilized for single-shot pulsed s-parameter measurements on the DUT.

20. The apparatus of any preceding embodiment, wherein said apparatus is utilized for performing impulse response analysis of high bandwidth analog-to-digital converters.

21. The apparatus of any preceding embodiment, wherein said apparatus is utilized to perform real-time study of the change in the frequency spectrum during the transitions for switched power RF circuits such as power amplifiers.

22. The apparatus of any preceding embodiment, wherein said apparatus is utilized to perform transient analysis for measuring turn ON transients in electrical and opto-electronic components/circuits/modules/sub-systems/systems.

23. The apparatus of any preceding embodiment, wherein said apparatus is utilized to measure skew in high-speed input output (IO) bus lanes.

24. The apparatus of any preceding embodiment, wherein said apparatus is utilized to perform frequency-domain analysis for the DUT by applying fast Fourier transform on the time-domain measurement, thereby obviating the need for a wide-band frequency synthesizer, unlike conventional VNAs.

25. The apparatus of any preceding embodiment, wherein said apparatus is utilized to perform high throughput, real-time measurements of frequency dependent complex permittivity of dielectric materials.

26. The apparatus of any preceding embodiment, wherein said apparatus is utilized to perform single-shot measurement of recombination lifetimes of semiconductor materials.

27. An apparatus for performing single-shot network analysis of multiple electrical, electronic and electro-optical elements as a device under test (DUT), the apparatus comprising: (a) a pulsed optical source configured for generating a pulsed optical output; (b) a first dispersion element configured for receiving said pulsed optical output and chirping it into a chirped pulsed optical output; (c) at least one modulator configured for receiving said chirped pulsed optical output; (d) an optical calibration delay element configured for each of multiple devices under test (DUT), each said optical calibration delay element is configured for receiving said pulsed optical output and generating a selectably delayed pulse source signal configured for receipt by a device under test (DUT), so that a response signal from the DUT overlaps in time with said chirped pulsed optical output; (e) said modulator is configured for modulating segments of said electrical response signal from the DUT over said chirped pulsed optical output and generating a modulated optical pulse output; (f) wherein said at least one modulator comprises multiple modulators each of which being configured for coupling to each of said multiple devices under test (DUT), or comprises a modulator coupled to a switch or multiplexer configured for coupling to each of said multiple devices under test (DUT) for selecting output signals from said multiple devices under test (DUT) to be directed to the modulator; (g) wherein said modulator, or each said modulators in multiple modulators, is configured for modulating segments of an electrical response signal from said multiple devices under test (DUT) over said the pulsed optical source into modulated optical pulses; (h) a second dispersion element coupled to said shared modulator, or each of multiple dispersion elements coupled to each of said multiple modulators, for receiving modulated optical pulses and stretching them in time domain into stretched optical pulses; and (i) at least one optical detector configured for receiving said stretched optical pulses and converting them into analog electrical signals configured for analysis and/or display; (j) whereby said apparatus captures a segment of said response signal from multiple DUTs in real-time and performs network analysis with much reduced test time.

28. The apparatus of any preceding embodiment, wherein each said optical calibration delay element is configured to either: (1) delay said pulsed optical output for receipt by an optical input of an optical device under test (DUT), or to (2) delay said pulsed optical output and convert it to a pulsed electrical output signal for receipt by an electrical input of an electrical device under test (DUT).

29. The apparatus of any preceding embodiment, further comprising: (a) at least one analog-to-digital converter (ADC) configured for converting said analog electrical signals into digital signals; and (b) at least one digital processing device, and memory storing instructions executable by said at least one processing device, configured for capturing a segment of said digital signals and performing network analysis and/or display of said digital signals.

30. The apparatus of any preceding embodiment, wherein said at least one analog-to-digital converter (ADC) is configured for converting electrical equivalent of the stretched optical source into a substantially lower frequency than said input signal being captured by said apparatus.

31. The apparatus of any preceding embodiment, wherein said at least one modulator comprises a modulator selected from the group of modulators consisting of electro-optic modulators (EOMs), Mach-Zehnder modulators, and electro-absorption modulators (EAMs).

32. The apparatus of any preceding embodiment, wherein said apparatus is configured for being incorporated within automated test equipment (ATE) enabling high volume production phase testing of opto-electronic and RF and microwave DUTs at significantly reduced test times.

33. The apparatus of any preceding embodiment, wherein said apparatus is configured for performing synchronous testing of electrical and optical devices under test (DUTs).

34. The apparatus of any preceding embodiment, wherein said apparatus is configured for performing simultaneous testing of multiple electrical and/or optical devices under test (DUTs) toward reducing test times.

35. A method of performing single-shot network analysis of electrical, electronic and electro-optical elements as a device under test (DUT), the method comprising: (a) generating a pulsed optical output; (b) receiving said pulsed optical output and chirping it into a chirped pulsed optical output; (c) delaying said pulsed optical output for receipt by an optical input of a device under test (DUT), or delaying said pulsed optical output and then converting it to an electrical signal for receipt by an electrical input of a device under test (DUT), so that an electrical response signal from the DUT overlaps in time with said chirped pulsed optical output; (d) modulating said chirped pulsed optical output into a modulated pulsed optical output in response to receiving said electrical response signal from the device under test (DUT); (e) dispersing said modulated pulsed optical output for stretching it in time-domain into a stretched optical source signal; and (f) converting said stretched optical source signal into an analog electrical signal configured for analysis and/or display.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Comparison of Specifications of SiNA with a Bench-top Non-linear Vector Network Analyzer (NVNA)

| Specification | VNA | SiNA |
|---|---|---|
| Acquisition time | μs to ms [1] | 27 ns - Single-shot |
| Equivalent Sampling Rate | Signal down-converted & digitized or sampling oscilloscope used | 750 GSps [2] Burst sampling throughput using time-stretch |
| Operational bandwidth | 300 kHz to 110 GHz for Keysight N5251A | 5 GHz to 40 GHz [3] |
| Jitter in one-shot measurements | Not available | 5 fs [4] |
| Power | 670 W for Keysight N5251A | 150 W |
| Size | 6-RU (Bench-top instruments are bulky) | 3-U Rackmount |

[1] Multiple sweeps required and is very slow for applications, such as s-parameter measurements (can even take hours)
[2] Can be tuned by changing the dispersion in the system.
[3] Limited by modulator (can go up to 110 GHz) and dispersion (can be tuned)
[4] It is preferable that this jitter be as low as possible (can be tuned).

What is claimed is:

1. An apparatus for performing single-shot network analysis of electrical, electronic and electro-optical elements as a device under test (DUT), the apparatus comprising:
    a pulsed optical source configured for generating a pulsed optical output;
    a first dispersion element configured for receiving said pulsed optical output and chirping it into a chirped pulsed optical output;
    a modulator configured for receiving said chirped pulsed optical output;
    an optical calibration delay element which receives said pulsed optical output and generates a delayed pulse source signal configured for receipt by a device under test (DUT), so that an electrical response signal from the DUT overlaps in time with said chirped pulsed optical output;
    said modulator is configured for modulating segments of said electrical response signal from the DUT over said chirped pulsed optical output and generating a modulated optical pulse output;
    a second dispersion element configured for receiving said modulated optical pulse output and time-domain stretching it into a stretched optical source signal; and
    an optical detector configured for receiving said stretched optical source signal and converting it into an analog electrical signal configured for analysis and/or display.

2. The apparatus of claim 1, wherein said optical calibration delay element is configured to either: (1) delay said pulsed optical output for receipt by an optical input of an optical device under test (DUT), or to (2) delay said pulsed optical output and convert it to a pulsed electrical output signal for receipt by an electrical input of a device under test (DUT).

3. The apparatus of claim 1, further comprising an arbitrary waveform generator configured for receiving said pulsed optical output and generating said delayed pulse source signal of suitable bandwidth for the DUT to be tested from the said pulsed optical source.

4. The apparatus of claim 1, wherein said modulator comprises a modulator selected from the group of modulators consisting of electro-optic modulators (EOMs), Mach-Zehnder modulators, and electro-absorption modulators (EAMs).

5. The apparatus of claim 4, wherein said analog-to-digital converter (ADC) is configured for converting the electrical equivalent of the stretched optical source and which operates at a substantially lower frequency than said input signal being captured by said apparatus.

6. The apparatus of claim 4, wherein said digital processing device comprises a field programmable gate array (FPGA).

7. The apparatus of claim 4, further comprising instructions stored in memory and executable by said digital processing device for performing time-domain reflectometry (TDR) comprising averaging repetitive reflected waveforms over multiple scans and increasing sensitivity and/or reducing test time.

8. The apparatus of claim 1, further comprising:
an analog-to-digital converter (ADC) configured for converting said analog electrical signal into a digital signal; and
a digital processing device, and memory storing instructions executable by said processing device, configured for capturing a segment of said digital signal and performing network analysis and/or display of said digital signal.

9. The apparatus of claim 1, wherein said electrical, electronic and/or electro-optical elements are selected from the group of elements consisting of electrical, electronic and electro-optical: components, circuits, modules, sub-systems and systems.

10. The apparatus of claim 1, wherein said pulsed optical source is configured with a mode-locked laser (MLL) coupled through a highly non-linear fiber (HNLF).

11. The apparatus of claim 1, wherein said second dispersion element comprises a dispersive optical fiber or a Fiber Bragg Grating (FBG).

12. The apparatus of claim 1, wherein said stretching comprises stretching the input signal up to multiple orders of magnitude longer, in response to which an analog-to-digital converter circuit is utilized which is one or more orders of magnitude slower than bandwidth of the input source.

13. The apparatus of claim 1, further comprising instructions stored in memory and executable by said processing device for performing high-speed, single-shot two-port network analysis of electrical and optical DUT at 27 ns measurement time.

14. The apparatus of claim 1, wherein said apparatus is utilized for performing bandwidth measurements, impulse and step response analysis of electrical and optical DUT such as photo-diodes, electro-optic intensity modulators, RF and microwave amplifiers, etc. at significantly reduced test time.

15. The apparatus of claim 1, wherein said apparatus is utilized for performing bandwidth measurements, impulse and step response analysis of electro-optic phase modulators at significantly reduced test time, by performing phase modulation (PM) to amplitude modulation (AM) conversion, by either (a) coherent detection or (b) dispersion, before providing the PM-AM converted response to a photodetector, the output of which is to be received by the apparatus.

16. The apparatus of claim 1, wherein said apparatus is utilized for performing single-shot transient, non-repetitive, non-linear response analysis and large-signal network analysis of electrical and optical DUT at significantly reduced test time.

17. The apparatus of claim 1, wherein said apparatus is utilized for single-shot two-port vector network analyses on the DUT.

18. The apparatus of claim 17, wherein said single-shot two-port vector network analyses on the DUT comprise generating plots of amplitude, frequency and/or phase.

19. The apparatus of claim 1, wherein said apparatus is utilized for single-shot pulsed s-parameter measurements on the DUT.

20. The apparatus of claim 1, wherein said apparatus is utilized for performing impulse response analysis of high bandwidth analog-to-digital converters.

21. The apparatus of claim 1, wherein said apparatus is utilized to perform real-time study of the change in the frequency spectrum during the transitions for switched power RF circuits such as power amplifiers.

22. The apparatus of claim 1, wherein said apparatus is utilized to perform transient analysis for measuring turn ON transients in electrical and opto-electronic components/circuits/modules/sub-systems/systems.

23. The apparatus of claim 1, wherein said apparatus is utilized to measure skew in high-speed input output (IO) bus lanes.

24. The apparatus of claim 1, wherein said apparatus is utilized to perform frequency-domain analysis for the DUT by applying fast Fourier transform on the time-domain measurement, thereby obviating the need for a wide-band frequency synthesizer, unlike conventional VNAs.

25. The apparatus of claim 1, wherein said apparatus is utilized to perform high throughput, real-time measurements of frequency dependent complex permittivity of dielectric materials.

26. The apparatus of claim 1, wherein said apparatus is utilized to perform single-shot measurement of recombination lifetimes of semiconductor materials.

27. An apparatus for performing single-shot network analysis of multiple electrical, electronic and electro-optical elements as a device under test (DUT), the apparatus comprising:
a pulsed optical source configured for generating a pulsed optical output;
a first dispersion element configured for receiving said pulsed optical output and chirping it into a chirped pulsed optical output;
at least one modulator configured for receiving said chirped pulsed optical output;
an optical calibration delay element configured for each of multiple devices under test (DUT), each said optical calibration delay element is configured for receiving said pulsed optical output and generating a selectably delayed pulse source signal configured for receipt by a device under test (DUT), so that a response signal from the DUT overlaps in time with said chirped pulsed optical output;
said modulator is configured for modulating segments of said electrical response signal from the DUT over said chirped pulsed optical output and generating a modulated optical pulse output;

wherein said at least one modulator comprises multiple modulators each of which being configured for coupling to each of said multiple devices under test (DUT), or comprises a modulator coupled to a switch or multiplexer configured for coupling to each of said multiple devices under test (DUT) for selecting output signals from said multiple devices under test (DUT) to be directed to the modulator;

wherein said modulator, or each said modulators in multiple modulators, is configured for modulating segments of an electrical response signal from said multiple devices under test (DUT) over said the pulsed optical source into modulated optical pulses;

a second dispersion element coupled to said shared modulator, or each of multiple dispersion elements coupled to each of said multiple modulators, for receiving modulated optical pulses and stretching them in time domain into stretched optical pulses; and at least one optical detector configured for receiving said stretched optical pulses and converting them into analog electrical signals configured for analysis and/or display;

whereby said apparatus captures a segment of said response signal from multiple DUTs in real-time and performs network analysis with much reduced test time.

28. The apparatus of claim 27, wherein each said optical calibration delay element is configured to either: (1) delay said pulsed optical output for receipt by an optical input of an optical device under test (DUT), or to (2) delay said pulsed optical output and convert it to a pulsed electrical output signal for receipt by an electrical input of an electrical device under test (DUT).

29. The apparatus of claim 27, further comprising:
at least one analog-to-digital converter (ADC) configured for converting said analog electrical signals into digital signals; and
at least one digital processing device, and memory storing instructions executable by said at least one processing device, configured for capturing a segment of said digital signals and performing network analysis and/or display of said digital signals.

30. The apparatus of claim 29, wherein said at least one analog-to-digital converter (ADC) is configured for converting electrical equivalent of the stretched optical source into a substantially lower frequency than said input signal being captured by said apparatus.

31. The apparatus of claim 27, wherein said at least one modulator comprises a modulator selected from the group of modulators consisting of electro-optic modulators (EOMs), Mach-Zehnder modulators, and electro-absorption modulators (EAMs).

32. The apparatus of claim 27, wherein said apparatus is configured for being incorporated within automated test equipment (ATE) enabling high volume production phase testing of opto-electronic and RF and microwave DUTs at significantly reduced test times.

33. The apparatus of claim 27, wherein said apparatus is configured for performing synchronous testing of electrical and optical devices under test (DUTs).

34. The apparatus of claim 27, wherein said apparatus is configured for performing simultaneous testing of multiple electrical and/or optical devices under test (DUTs) toward reducing test times.

35. A method of performing single-shot network analysis of electrical, electronic and electro-optical elements as a device under test (DUT), the method comprising:
generating a pulsed optical output;
receiving said pulsed optical output and chirping it into a chirped pulsed optical output;
delaying said pulsed optical output for receipt by an optical input of a device under test (DUT), or delaying said pulsed optical output and then converting it to an electrical signal for receipt by an electrical input of a device under test (DUT), so that an electrical response signal from the DUT overlaps in time with said chirped pulsed optical output;
modulating said chirped pulsed optical output into a modulated pulsed optical output in response to receiving said electrical response signal from the device under test (DUT);
dispersing said modulated pulsed optical output for stretching it in time-domain into a stretched optical source signal; and
converting said stretched optical source signal into an analog electrical signal configured for analysis and/or display.

* * * * *